United States Patent
Kim et al.

(10) Patent No.: US 12,009,595 B2
(45) Date of Patent: Jun. 11, 2024

(54) ANTENNA STRUCTURE AND ELECTRONIC DEVICE INCLUDING SAME

(71) Applicants: Samsung Electronics Co., Ltd., Suwon-si (KR); Industry-Academic Cooperation Foundation, Yonsei University, Seoul (KR)

(72) Inventors: Junggil Kim, Suwon-si (KR); Youngjoong Yoon, Seoul (KR); Sungsoo Kim, Suwon-si (KR); Sunghoe Kim, Seoul (KR); Janghwan Bae, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 234 days.

(21) Appl. No.: 17/569,132

(22) Filed: Jan. 5, 2022

(65) Prior Publication Data

US 2022/0131276 A1 Apr. 28, 2022

Related U.S. Application Data

(63) Continuation of application No. PCT/KR2020/008748, filed on Jul. 3, 2020.

(30) Foreign Application Priority Data

Jul. 5, 2019 (KR) .................. 10-2019-0081649

(51) Int. Cl.
*H01Q 1/38* (2006.01)
*H01Q 21/06* (2006.01)
(Continued)

(52) U.S. Cl.
CPC ........ *H01Q 21/064* (2013.01); *H04M 1/0214* (2013.01); *H04M 1/0266* (2013.01); *H01Q 1/243* (2013.01)

(58) Field of Classification Search
CPC ...... H01Q 21/064; H01Q 1/243; H01Q 3/242; H01Q 21/28; H01Q 21/30; H01Q 1/38;
(Continued)

(56) References Cited

U.S. PATENT DOCUMENTS 10,516,201 B2 * 12/2019 Khripkov ................. H01Q 3/40
10,886,597 B2 * 1/2021 Hu ......................... H01Q 21/28
(Continued)

FOREIGN PATENT DOCUMENTS

JP 2011-044977 A 3/2011
KR 10-2016-0148698 A 12/2016
(Continued)

OTHER PUBLICATIONS

International Search Report and Written Opinion of the International Searching Authority dated Oct. 8, 2020, in connection with International Application No. PCT/KR2020/008748, 12 pages.
(Continued)

*Primary Examiner* — Hai V Tran
*Assistant Examiner* — Bamidele A Immanuel

(57) ABSTRACT

Electronic device is provided. The electronic device comprises: a housing surrounding a space between first and second plates and including a side surface member of which at least a portion includes a conductive section; a communication module; and an antenna structure. The conductive section includes first and second regions formed at a different position. The antenna structure includes a plurality of first slot sets formed in the first region, wherein at least two first slots extending in a first direction combine to form one first slot set and the plurality of first slot sets are formed at
(Continued)

first designated intervals in a second direction, and a plurality of second slot sets formed in the second region. At least two second slots extending in the first direction combine to form one second slot set and the plurality of second slot sets are formed at second designated intervals in the second direction.

20 Claims, 17 Drawing Sheets

(51) Int. Cl.
*H04M 1/02* (2006.01)
*H01Q 1/24* (2006.01)

(58) Field of Classification Search
CPC ....... H01Q 1/46; H01Q 21/06; H04M 1/0214; H04M 1/0266; H04M 1/026; H04M 1/0216; H04M 1/0249; H04M 1/0277
See application file for complete search history.

(56) References Cited

U.S. PATENT DOCUMENTS

| | | | |
|---|---|---|---|
| 2002/0030627 A1* | 3/2002 | Cassel | H01Q 1/243 343/702 |
| 2003/0090426 A1 | 5/2003 | Sun et al. | |
| 2006/0028387 A1* | 2/2006 | Kuo | H01Q 9/40 343/702 |
| 2014/0218250 A1* | 8/2014 | Kim | H01Q 5/364 343/767 |
| 2015/0380819 A1 | 12/2015 | Komulainen et al. | |
| 2016/0049734 A1* | 2/2016 | Kim | H01Q 13/16 343/702 |
| 2016/0192517 A1* | 6/2016 | Tsao | H04B 1/3888 361/679.01 |
| 2017/0093022 A1* | 3/2017 | Cai | H01Q 21/28 |
| 2018/0248252 A1* | 8/2018 | Hu | H01Q 5/321 |
| 2019/0140342 A1* | 5/2019 | Lim | H01Q 1/243 |
| 2020/0014119 A1* | 1/2020 | Kim | H01Q 1/523 |
| 2021/0111484 A1* | 4/2021 | Jang | H01Q 1/38 |

FOREIGN PATENT DOCUMENTS

| | | |
|---|---|---|
| KR | 10-2017-0120985 A | 11/2017 |
| KR | 10-2018-0060299 A | 6/2018 |
| WO | 2015049816 A1 | 4/2015 |

OTHER PUBLICATIONS

Kim, et al., "Switched Folded Slot Phased Array Antenna for mm Wave 5G Mobile in Metal Bezel Design," 2018 IEEE International Symposium on Antennas and Propagation & USNC/URSI National Radio Science Meeting, 2018, 2 pages.

Request for the Submission of an Opinion dated Oct. 24, 2024, in connection with Korean Application No. 10-2019-0081649, 8 pages.

* cited by examiner

ANTENNA STRUCTURE AND ELECTRONIC DEVICE INCLUDING SAME

CROSS-REFERENCE TO RELATED APPLICATIONS

This application is a Bypass Continuation of International Application No. PCT/KR2020/008748, filed Jul. 3, 2020, which claims priority to Korean Patent Application No KR 10-2019-0081649, filed Jul. 5, 2019, the disclosures of which are herein incorporated by reference in their entirety.

BACKGROUND

1. Field

Various embodiments of the disclosure relate to an antenna structure providing a wireless communication function and an electronic device including the same.

2. Description of Related Art

The provision of services of constant quality over a commercially available wireless communication network need meet a high antenna device gain and a broad beam coverage area. A next-generation mobile communication service (e.g., 5G communication) with a frequency band of a few tens of GHz (e.g., a frequency band ranging from 30 GHz to 300 GHz and a resonant frequency wavelength ranging about 1 mm to about 10 mm) implements easy connection (e.g., wireless linkage) with nearby electronic devices and enhanced energy efficiency, thereby providing enhanced connection expandability and quicker and more stable quality of wireless communication network to users.

SUMMARY

Since the resonant frequency wavelength of the antenna device used for 5G communication (or mmWave communication) merely ranges from about 1 mm to about 10 mm, the radiation performance of the antenna device may be significantly distorted depending on the installation environment due to its high straightness and directivity. For example, when an antenna device for mmWave communication is equipped in an electronic device, the performance of the antenna device may be lowered due to interference by the structures around the electronic device or the user's body.

According to some embodiments, control of the antenna beam radiation range of the antenna device (steering range control) is possible using the processor and the communication module mounted inside the electronic device, but it is merely one-dimensional control. Further, it may be difficult to exhibit the optimized operating characteristics of the antenna device because the bezel design of the material of the electronic device, e.g., a metal material, is not considered.

Further, slot-type antenna devices known so far may form a single slot antenna structure, which may not easily support a wider frequency band.

In various embodiments of the disclosure, there may be provided an antenna structure capable of providing a stable wireless communication function by reducing distortion of radiation performance due to interference of the installation environment and surroundings of the antenna structure, and an electronic device including the same.

According to various embodiments of the present disclosure, there may be provided an antenna structure capable of securing a stable radiation performance in a mmWave frequency band and an electronic device including the same.

According to various embodiments of the disclosure, an electronic device may comprise a housing including a first plate, a second plate facing in a direction opposite to the first plate, and a side surface member surrounding a space between the first plate and the second plate and at least partially including a conductive portion, a communication module, and an antenna structure electrically connected with the communication module. The conductive portion of the side surface member may include a first area and a second area formed in a position different from the first area. The antenna structure may include a plurality of first slot sets formed in the first area, a first slot set formed by combining at least two first slots extending in a first direction, and the plurality of first slot sets formed with a first designated gap in a second direction and a plurality of second slot sets formed in the second area, a second slot set formed by combining at least two second slots extending in the first direction, and the plurality of second slot sets formed with a second designated gap in the second direction. At least two first slots included in the first slot set may be formed to have different lengths in the first direction each other, and at least two second slots included in the second slot set may be formed to have different lengths in the first direction each other.

According to various embodiments of the disclosure, an electronic device may comprise a housing including a first plate, a second plate facing in a direction opposite to the first plate, and a side surface member surrounding a space between the first plate and the second plate and at least partially including a conductive portion, a communication module, an antenna structure electrically connected with the communication module, and at least one processor controlling beamforming in a horizontal direction using the antenna structure or controlling beamforming in a vertical direction using the antenna structure. The conductive portion of the side surface member may include a first area and a second area formed in a position different from the first area. The antenna structure may include a plurality of first slot sets formed in the first area, a first slot set formed by combining at least two first slots extending in a first direction, and the plurality of first slot sets formed with a designated gap in a second direction and a plurality of second slot sets formed in the second area, a second slot set formed by combining at least two second slots, and the plurality of second slot sets formed with the designated gap in the second direction. At least two first slots included in the first slot set may be formed to have different lengths in the first direction each other, and at least two second slots included in the second slot set may be formed to have different lengths in the second direction each other. The first slot set and the second slot set formed in the position corresponding to the first slot set are symmetrically formed with respect to a designated point in a virtual line passing through a center of the conductive portion.

According to various embodiments of the disclosure, an electronic device may comprise a housing including a first plate, a second plate facing in a direction opposite to the first plate, and a side surface member surrounding a space between the first plate and the second plate and at least partially including a conductive portion and at least one antenna structure disposed in at least a portion of the side surface member. The antenna structure may include a conductive portion surrounding the space and including a first surface facing an outside of the electronic device and at least one of a first extension extending from a first end of the conductive portion and formed with a second surface at least partially facing in a direction different from a direction in which the first surface faces or a second extension extending from a second end of the conductive portion and formed with a third surface at least partially facing in a direction different from the direction in which the first surface faces. The conductive portion may include a first area in which a first slot set is formed and a second area in which a second slot set is formed. The first slot set is formed of a combination of at least two first slots formed to have different lengths in a first direction each other. A plurality of first slot sets may be formed with a designated gap in a second direction. The second slot set may be formed of a combination of at least two second slots formed to have different lengths in the first direction each other. A plurality of second slot sets may be formed with a designated gap in the second direction. The second slot set formed in a position corresponding to the first slot set may have a shape symmetrical with the first slot set with respect to a designated point in a virtual line passing through the conductive portion.

According to various embodiments of the disclosure, an antenna structure and an electronic device including the same may secure stable radiation performance by configuring at least a portion of a housing as an antenna structure for millimeter wave communication. For example, an antenna structure may be formed using a plurality of slots (forming an array antenna) formed separately in at least two areas of the side surface member and may be connected with a communication circuit, radiating an antenna beam. Thus, it is possible to reduce signal interference caused by other electronic components or surrounding structures inside the electronic device and ensure the radiation performance.

According to various embodiments of the disclosure, it is possible to transmit and receive millimeter waves by forming a phased array antenna in the antenna structure. Further, according to various embodiments of the disclosure, a plurality of feeding units capable of independently applying signals to an antenna structure formed with a plurality of slots are disposed adjacent, thereby making it easy to adjust the resonant frequency.

Further, according to various embodiments of the disclosure, in an antenna structure and an electronic device including the same, a plurality of slots may be grouped into one slot set, and a plurality of slot sets form an array (e.g., multi-slot antenna), thereby supporting a wider frequency band.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 19C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure are described with reference to the accompanying drawings.

Figure 1:
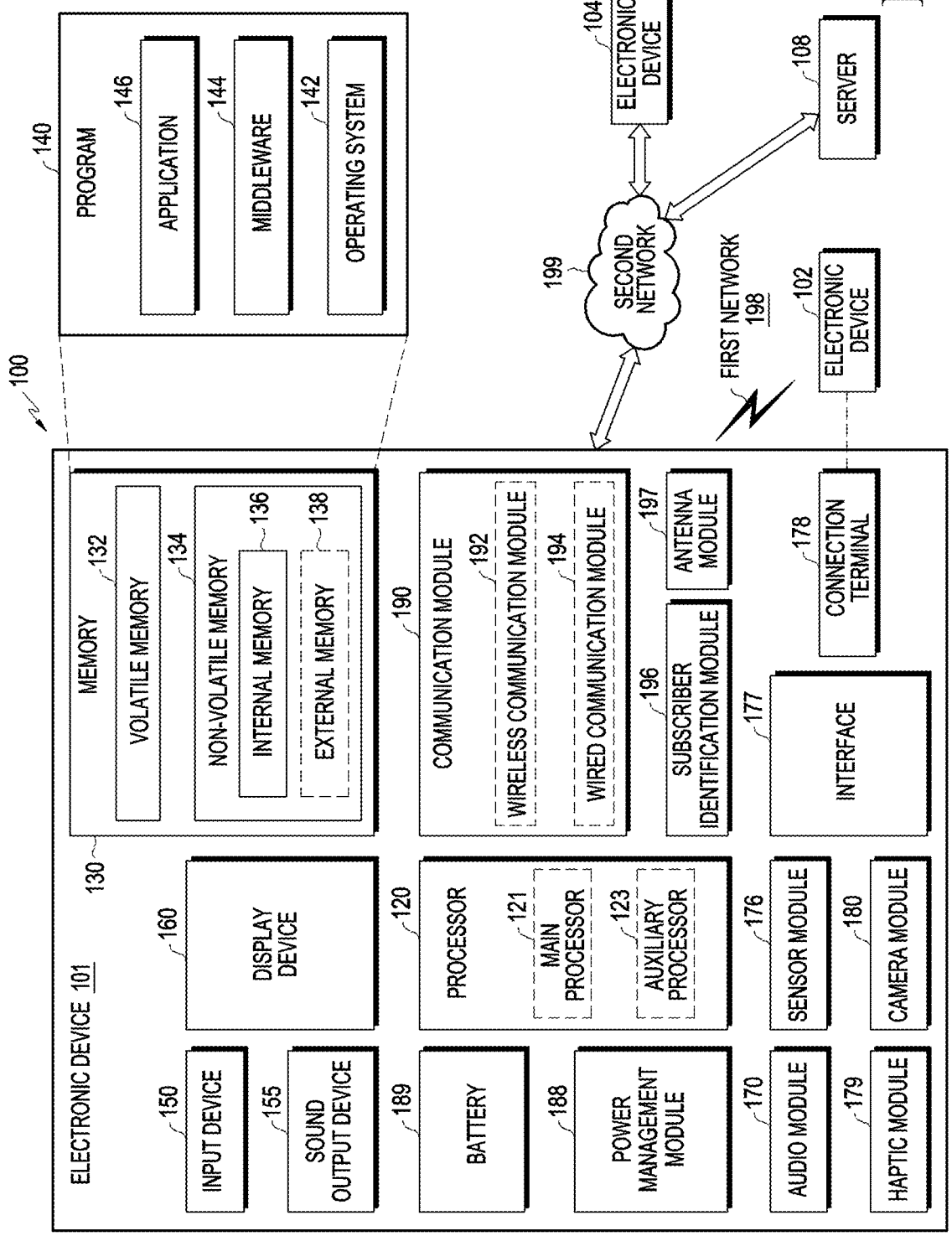
FIG. 1 is a block diagram illustrating an electronic device in a network environment according to various embodiments of the present disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
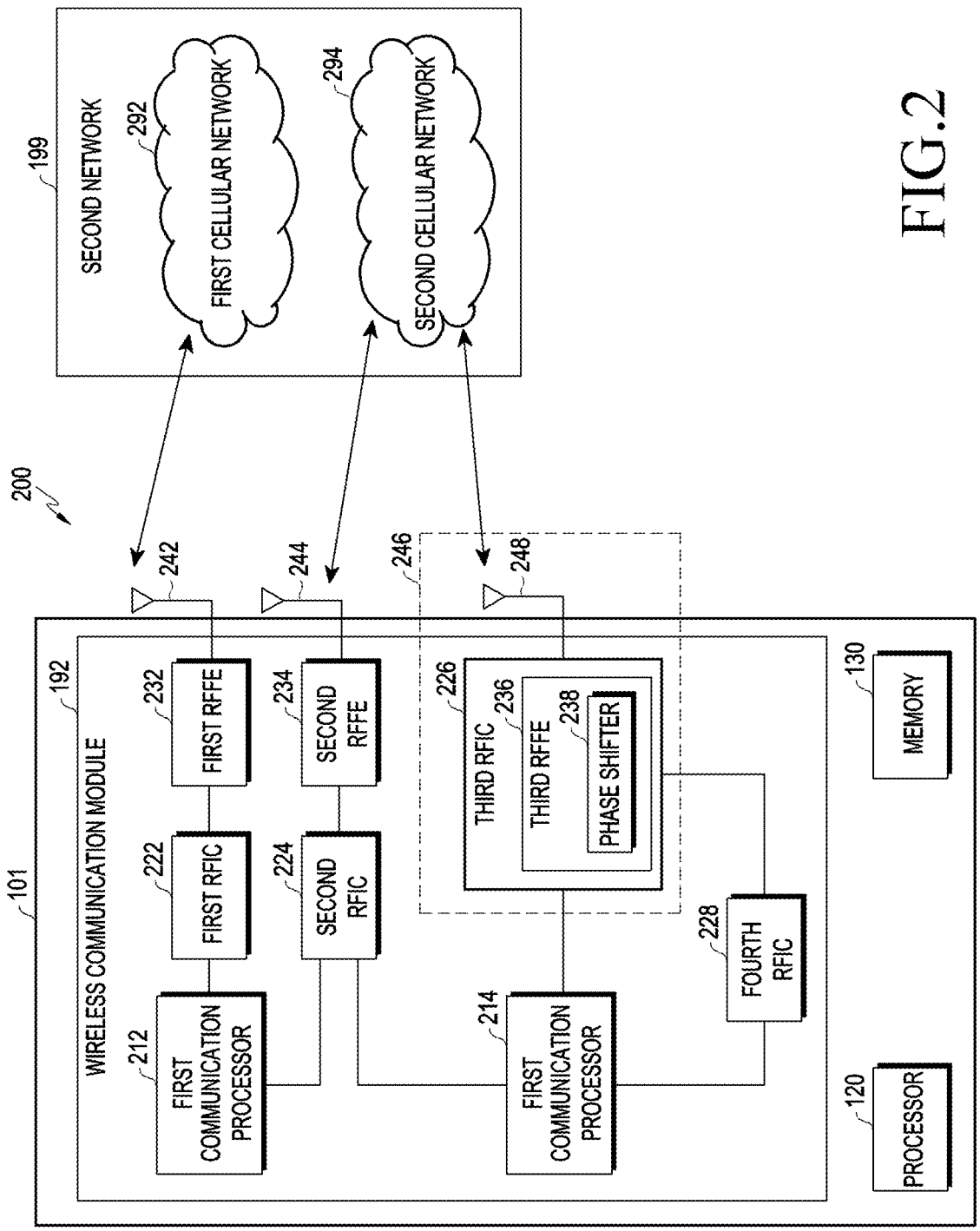
FIG. 2 is a block diagram illustrating an electronic device in a network environment including a plurality of cellular networks according to various embodiments of the present disclosure.

FIG. 2 is a block diagram 200 of an electronic device 100 in a network environment including a plurality of cellular networks according to an embodiment of the present disclosure.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The second network 199 may include a first cellular network 292 and a second cellular network 294. According to another embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or be included as part of the third RFIC 226.

The first communication processor 212 may establish a communication channel of a band that is to be used for wireless communication with the first cellular network 292 or may support legacy network communication via the established communication channel. According to various embodiments, the first cellular network may be a legacy network that includes second generation (2G), third generation (3G), fourth generation (4G), or long-term evolution (LTE) networks. The second communication processor 214 may establish a communication channel corresponding to a designated band (e.g., from about 6 GHz to about 60 GHz) among bands that are to be used for wireless communication with the second cellular network 294 or may support fifth generation (5G) network communication via the established communication channel.

According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel. According to an embodiment, the first CP 212 and the second CP 214 may be implemented in a single chip or a single package. According to an embodiment, the first communication processor 212 or the second communication processor 214, along with the processor 120, an assistance processor 123, or communication module 190, may be formed in a single chip or single package.

Upon transmission, the first RFIC 222 may convert a baseband signal generated by the first CP 212 into a radio frequency (RF) signal with a frequency ranging from about 700 MHz to about 3 GHz which is used by the first cellular network 292 (e.g., a legacy network). Upon receipt, the RF signal may be obtained from the first cellular network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the second communication processor 214 may be directly connected to the third RFIC 226. Additionally or alternatively, when the electronic device 101 includes the fourth RFIC 228 separately from, or as at least part of, the third RFIC 226, the second communication processor 214 may be connected with the third RFIC 226 through the fourth RFIC 228.

According to an embodiment, the first RFIC 222 and the second RFIC 224 may be implemented as at least part of a single chip or single package. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second cellular network 294 (e.g., a 5G network).

According to an embodiment, the antenna 248 may be formed as an array antenna which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., new radio (NR) protocol information) for communication with the 5G network may be stored in the memory 230 and be accessed by other components (e.g., the processor 120, the first communication processor 212, or the second communication processor 214).

Figures 3A, 3B:
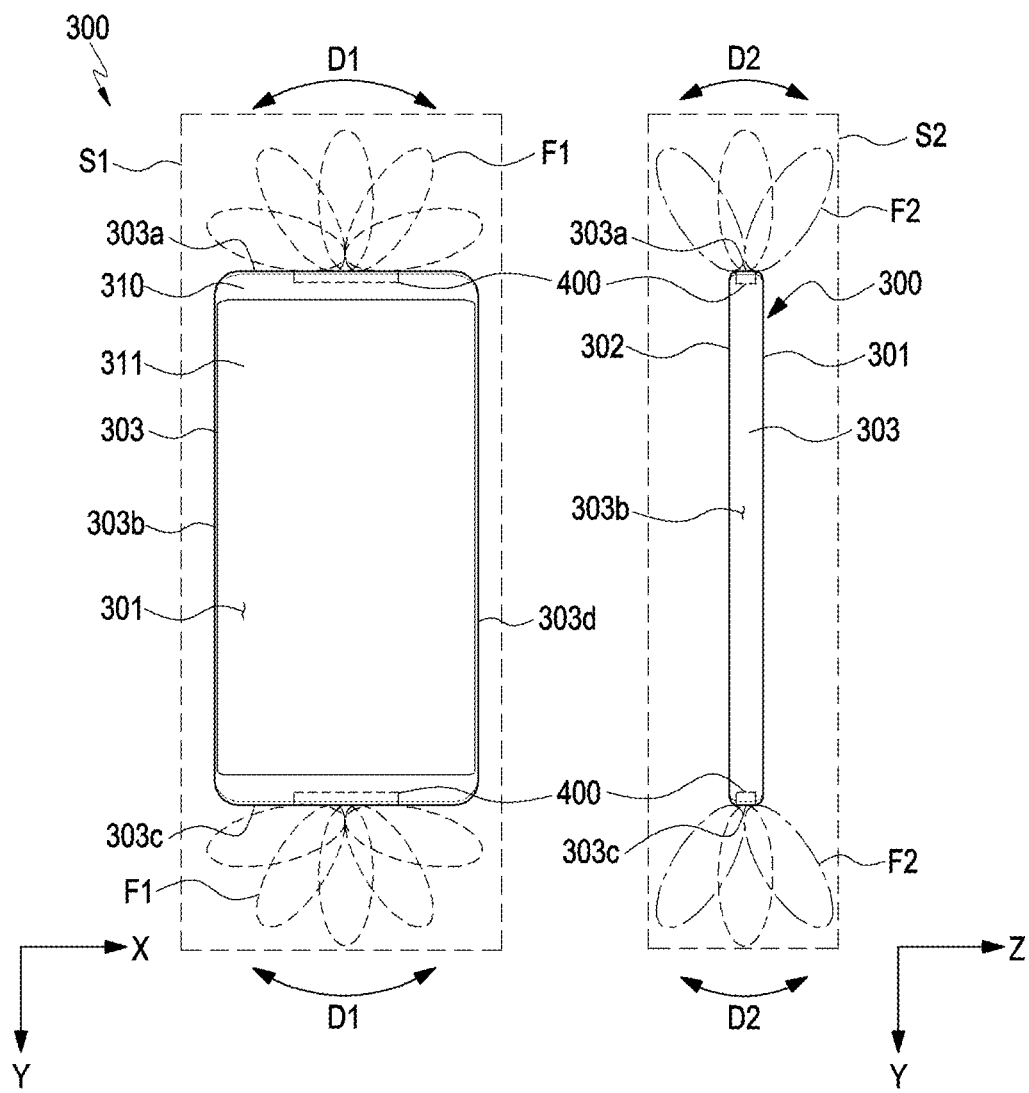
FIG. 3A is a front view schematically illustrating a range in which an antenna beam is radiated from an electronic device according to various embodiments of the present disclosure.
FIG. 3B is a side view schematically illustrating a range in which an antenna beam is radiated from an electronic device according to various embodiments of the present disclosure.

FIG. 3A is a front view schematically illustrating a range (beam steering range) in which an antenna beam is radiated from the electronic device 300 (e.g., the electronic device 101 of FIG. 1) according to various embodiments of the present disclosure. FIG. 3B is a side view schematically illustrating a range (beam steering range) in which an antenna beam is radiated from the electronic device 300 (e.g., the electronic device 101 of FIG. 1) according to various embodiments of the present disclosure.

Figure 4:
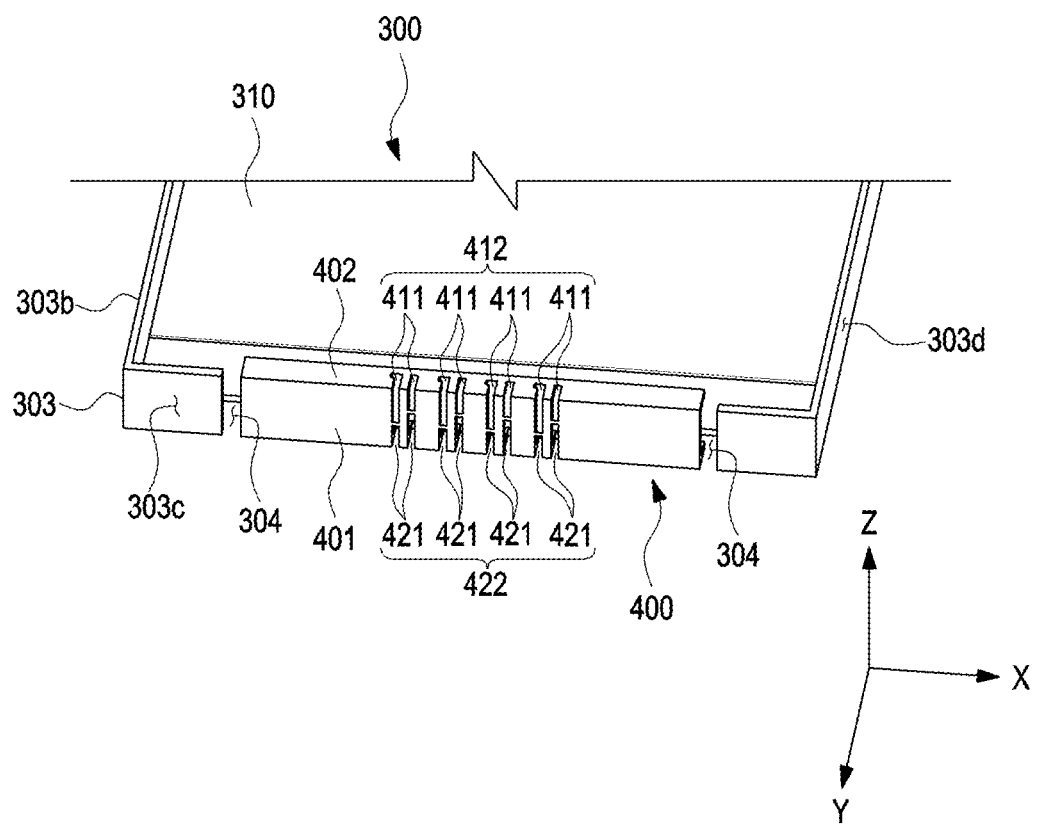
FIG. 4 is a perspective view schematically illustrating a housing and an antenna structure of an electronic device according to various embodiments of the present disclosure.

FIG. 4 is a perspective view schematically illustrating a housing 310 and an antenna structure 400 of the electronic device 300 (e.g., the electronic device 101 of FIG. 1), according to various embodiments of the present disclosure.

FIG. 3A illustrates a state in which the front surface 301 of the electronic device 300 is visible, and FIG. 3B may illustrate a state in which a side surface 303b of the electronic device 300 is visible.

Referring to FIGS. 3A, 3B, and 4, the electronic device 300 may include a housing 310 and may include at least one processor (e.g., the processor 120 of FIG. 1) and communication module (e.g., the communication module 190 of FIG. 1) in the housing 310. Further, the electronic device 300 may include an antenna structure 400 electrically connected with the communication module.

According to an embodiment, the housing 310 may include the other components of the electronic device 300. The housing 310 may include, e.g., a front plate (or first plate) including a front surface 301 of the electronic device 300, a rear plate (or second plate) including a rear surface facing away from the front surface 301, and a side surface member 303 attached to, or integrally formed with the rear plate and surrounding a space between the front plate and the rear plate. For example, the side surface member 303 may include at least one side surface 303a, 303b, 303c, and 303c facing in different directions from the front surface 301 and the rear surface 302. As another example, the side surface member may include a conductive portion including a conductive material. According to an embodiment, a display 311 exposed (visible) through a substantial portion of the front plate may be mounted on the front surface 301 of the electronic device 300.

According to an embodiment, the coordinate axes shown in the drawings of the disclosure may be used to denote the directions in which some components are oriented. Here, the coordinate axes may be the coordinate axes X, Y, and Z in a three-dimensional (3D) space. Referring to FIG. 3A, FIG. 3B and FIG. 4 together, the X axis may be an axis parallel to the width direction of the electronic device 300 (or the width direction of the antenna structure 400), and the Y axis may be an axis parallel to the length direction of the electronic device 300 (or the thickness direction of the antenna structure 400). The Z axis may be an axis parallel to the thickness direction of the electronic device 300 (or the height direction of the antenna structure 400). According to an embodiment, the XY plane may be a surface parallel to a virtual horizontal surface S1 drawn parallel to one surface of the front plate of the electronic device, and the YZ plane may be a surface parallel to a virtual vertical surface S2 orthogonal to the virtual horizontal surface of the electronic device.

According to various embodiments of the present disclosure, the processor 120 disposed inside the housing 310 may include one or more of a central processing unit, an application processor, a graphic processing unit (GPU), an image signal processor of a camera, or a baseband processor (or a communication processor (CP)). According to an embodiment, the processor 120 may be implemented in a system-on-chip (SoC) or system-in-package (SiP). The communication module 190 may include, e.g., a baseband processor or at least one communication circuit (e.g., IFIC, or RFIC). The communication module 190 may include, e.g., a baseband processor separate from the processor 120 (e.g., an application processor (AP)). In this case, the baseband processor of the communication module 190 may be disposed in one chip, together with the processor 120, or may be disposed in the form of an independent chip.

According to various embodiments of the present disclosure, it is possible to correspond to a first network 198 for short-range communication or a second network 199 for long-distance communication through the processor 120 and the communication module 190. According to an embodiment, it is possible to correspond to a first cellular network 292 and a second cellular network 294 included in the second network 199 through the processor 120 and the communication module 190. The first cellular network 292 and the second cellular network 294 may have a fourth generation (4G) network and a fifth generation (5G) network, respectively. The 4G network may support the long term evolution (LTE) protocol specified by the 3rd generation partnership project (3GPP). The 5G network may support, e.g., the new radio (NR) protocol specified by the 3GPP.

According to various embodiments of the present disclosure, the electronic device 300 may include a plurality of antenna modules (e.g., the third antenna module 246 of FIG. 2). The plurality of antenna modules may be disposed in a position very adjacent to the housing 310 inside the electronic device 300. In an embodiment, the at least one antenna module may reduce a propagation loss path when at least a portion of the housing is used as an antenna element (e.g., the antenna element 248 of FIG. 2).

For example, according to an embodiment in which four antenna modules (e.g., the antenna module 246 of FIG. 2) are provided, when viewed from above the front plate of the electronic device, one antenna module (e.g., a 3-1th antenna module (not shown)) may be disposed adjacent to the first side surface 303a at the upper end of the electronic device 300. Another antenna module (e.g., a 3-2th antenna module (not shown)) may be disposed adjacent to the second side surface 303b on the left side of the electronic device 300. Another antenna module (e.g., a 3-3th antenna module (not shown)) may be disposed adjacent to the third side surface 303c at the lower end of the electronic device 300. The other antenna module (e.g., a 3-4th antenna module (not shown)) may be disposed adjacent to the fourth side surface 303d on the right side of the electronic device 300. This is merely an example, and other various arrangements may be possible.

According to various embodiments of the present disclosure, at least a portion of the housing 310 may include a conductive material (e.g., metal (e.g., aluminum, stainless steel (STS), magnesium, or an alloy combining at least two or more thereof)). For example, at least a portion of the side surface member 303 of the housing 310 may include a metal frame (or metal bezel) structure, and at least another portion thereof may include a dielectric structure (e.g., a polymer structure).

According to various embodiments of the present disclosure, in a case where at least a portion of the housing 310 includes a metal frame structure, if a radio signal (or a communication signal) (e.g., an RF signal) is radiated from an antenna element disposed inside the electronic device, the radio signal propagates along the surface of the metal frame of the housing 310 and may thus be influenced by antenna performance. According to another embodiment, the signal may be interfered by other electronic components disposed inside the electronic device.

According to various embodiments of the disclosure, when at least a portion of the housing 310 has a metal frame structure, a slot may be formed in the metal frame to be used as an antenna element. At least a portion of the housing 310 may be used to form a slot-type antenna. By connecting the slot-type antenna to a substrate provided with a communication circuit (e.g., the third RFIC 226 of FIG. 2) using a conductive line (e.g., a coupled feeding line), an antenna module (e.g., the antenna module 246 of FIG. 2) may be formed. According to various embodiments of the present disclosure, the substrate provided with the communication circuit (e.g., the third RFIC 226 of FIG. 2) may be provided with a conductive line and/or another antenna element separate from the conductive line. According to an embodiment, when a radio signal is radiated from the conductive line or the antenna element, the signal may propagate through the slot antenna of the metal frame of the housing.

Referring to FIG. 3A, FIG. 3B and FIG. 4, according to various embodiments of the disclosure, the electronic device 300 may include an antenna structure 400 including a slot-type antenna formed in at least a portion (e.g., the side surface member 303) of the housing 310. Here, the antenna structure 400 may further include a feeding unit (e.g., a feeding unit 363 of FIG. 10 to be described below) and may be electrically connected with the communication circuit (e.g., the third RFIC 226 of FIG. 2) included in the electronic device 300 to form an antenna module (e.g., the third antenna module 246 of FIG. 2).

FIG. 3A and FIG. 3B simply illustrate that, for convenience of description, the antenna structure 400 is disposed at the center of the upper end and the center of the lower end of the electronic device 300 to radiate the antenna beam. However, without being limited thereto, the antenna structure 400 may be disposed in various positions unlike shown in the drawings.

According to various embodiments of the present disclosure, in the antenna structure 400, a first steering range of an antenna beam F1 (dashed line) may be formed on a virtual horizontal surface S1 of the electronic device 300. In an embodiment, the first steering range of the antenna beam F1 may cover substantially the entire range of the virtual horizontal surface S1 of the electronic device 300 along the D1 direction. According to various embodiments of the disclosure, the antenna structure 400 may have a second steering range of the antenna beam (F2) (dash-dotted line) on the virtual vertical surface S2 of the electronic device 300, as well as on the above-described one-dimensional area (virtual horizontal area). In an embodiment, the second steering range of the antenna beam F2 may cover substantially the entire range of the virtual vertical surface S2 of the electronic device 300 along the D2 direction.

According to various embodiments of the disclosure, the antenna structure 400 may be an antenna structure 400 provided for the 5G communication. An antenna structure 400, as a structure for stably transmitting/receiving millimeter waves while maximally reducing the path loss of propagation even when at least a portion of the housing 310 includes a conductive material, may be described below with reference to FIGS. 5 to 7.

According to an embodiment, the antenna structure 400 may be formed of, e.g., a conductive material, such as metal. Accordingly, current may flow through the antenna structure 400, and it is thus possible to transmit/receive signals to/from the outside. For example, when the frequency is up-converted in the communication circuit (e.g., RFIC), the antenna structure 400 may radiate the RF signals transferred through the conductive lines, to the outside. As another example, the antenna structure 400 may transmit the RF signal received through the antenna structure 400 to the communication circuit side so that the communication circuit may down-convert the RF signal to an IF signal.

Referring to FIG. 4, the antenna structure 400 may include a portion of the housing 310 of the electronic device (e.g., the electronic device 300 of FIG. 3a) or may be formed separately from the housing 310. For example, when the antenna structure 400 includes a portion of the housing 310, the antenna structure 400 may form an external shape of the electronic device. According to an embodiment, the antenna structure 400 may be formed using a side surface member 303 surrounding a space between a front plate and a rear plate of the housing 310. As another example, when the antenna structure 400 is formed separately from the housing 310, the antenna structure 400 may be assembled together with the housing 310 to form the electronic device 300. As another example, the antenna structure 400 may be formed in an antenna module and/or on a printed circuit board mounted in the inner space of the electronic device 300.

According to an embodiment, a segment 304 may be formed in the electronic device 300. According to another embodiment, the segment 304 may be filled with a dielectric material (e.g., a polymer material). According to an embodiment, the segment 304 may be filled with a polymer material formed through an injection process. By filling the segment 304 with a polymer material, the segment 304 may electrically disconnect the portion used as the antenna element of the antenna structure 400 from other portions of the housing 310 while preventing infiltration of foreign substances from the outside.

According to various embodiments of the present disclosure, the antenna structure 400 may operate as an antenna element (e.g., the antenna element 248) included in the third antenna module (e.g., the antenna module 246 of FIG. 2) in the above-described embodiment. For example, in a case where the antenna element has the form of a patch antenna, a loop antenna, or a dipole antenna, if the antenna structure 400 replaces the antenna element, the patch antenna, the loop antenna, or the dipole antenna may be omitted.

Hereinafter, a description will be made of an example in which at least a portion of the side surface member 303 of the electronic device 300 forms the antenna structure 400.

Referring to FIG. 4, according to an embodiment, the side surface member 303 of the electronic device 300, in whole or part, may include a conductive portion 401 formed of a conductive material. According to an embodiment, the conductive portion 401 may have a flat surface, but according to another embodiment, it may include at least some bent portions in addition to the flat portion. A slot-type antenna structure 400 may be formed by forming a slot in the conductive portion 401. The slot formed in the conductive portion 401 may extend in a first direction (e.g., a direction parallel to the Z-axis or a thickness direction of the electronic device 300). The slot formed in the conductive portion 401 may extend up to another component formed integrally with or separately from the conductive portion 401 and connected thereto.

For example, the side surface member 303 may include a first extension 402 extending from one end of the conductive portion 401 and/or a second extension (not shown in FIG. 4) extending from another end of the conductive portion 401. According to an embodiment, the antenna structure 400 may be formed by extending slots to the conductive portion 401, the first extension 402, and/or the second extension, respectively.

According to various embodiments of the disclosure, at least two or more slots formed in the side surface member 303 may be included in one slot set, and the antenna structure 400 may be formed using at least two or more slot sets arranged in one direction. As illustrated in FIG. 4, according to an embodiment, a first slot set 411 may be formed using two slots, and a plurality of first slot sets 412 may be formed using four first slot sets 411. According to another embodiment, a second slot set 421 may be formed using two slots, and a plurality of second slot sets 422 may be formed using four second slot sets 421.

Hereinafter, referring to FIG. 5 to FIG. 9, the antenna structure 400 is described in more detail.

Figure 5:
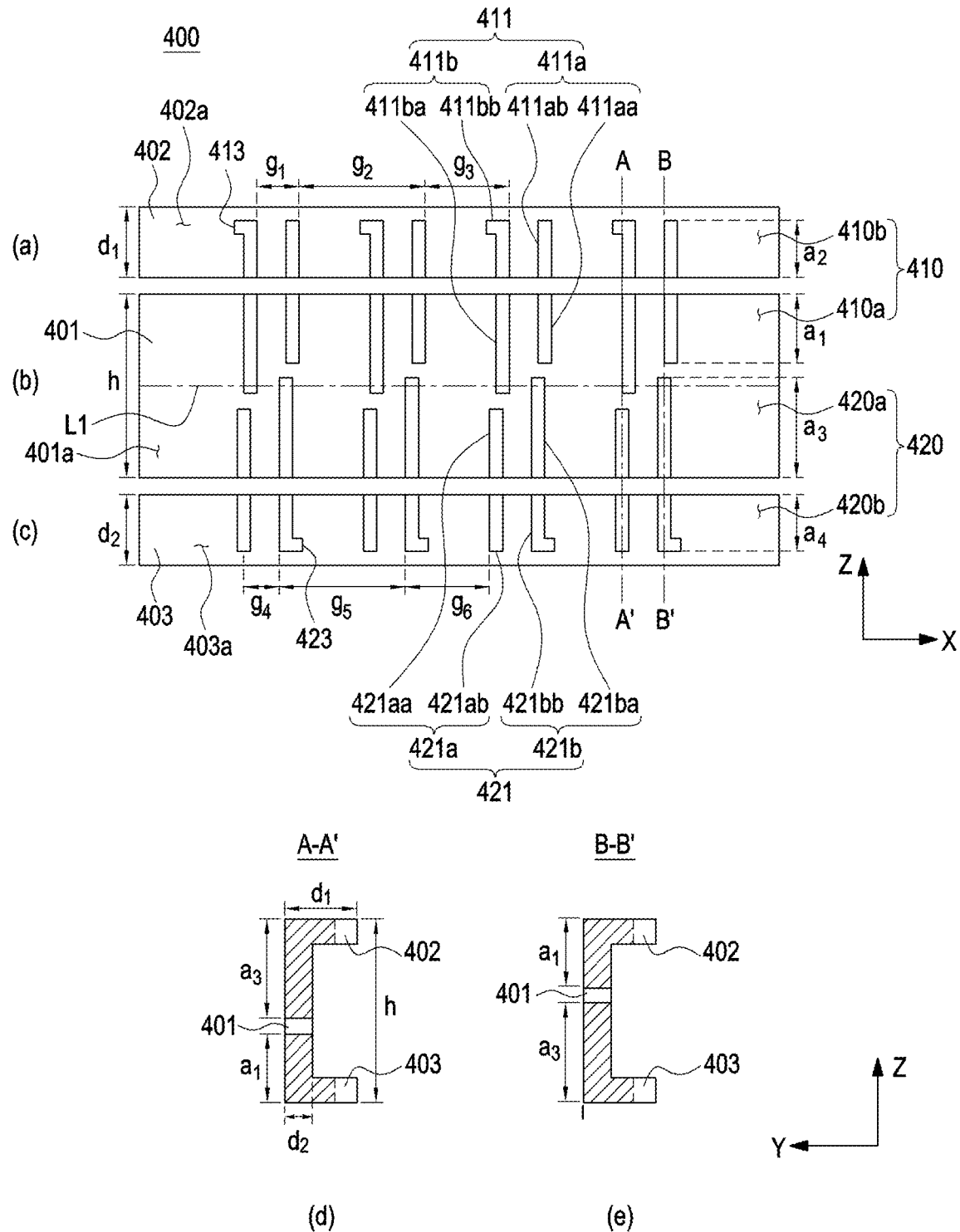
FIG. 5 is a view illustrating an antenna structure according to an embodiment of the present disclosure.

FIG. 5 is a view illustrating an antenna structure 400 according to an embodiment of the present disclosure.

According to an embodiment, the conductive portion 401 of the side surface member (e.g., the side surface member 303 of FIG. 4) may include two or more distinct areas. Here, two or more areas may be distinguished from each other through a certain physical boundary, but may also be simply distinguished through a virtual line that is not implemented in an actual product. For example, the conductive portion 401 may include a first area 410 in at least a portion thereof and a second area 420 in at least another portion thereof. According to an embodiment, the second area 420 may be adjacent to the first area 410, and as in the embodiment shown in FIG. 5, they may be distinguished by a virtual boundary line L1. According to an embodiment, the conductive portion 401 may surround the inner space of the electronic device 300 and may include a first surface 401a (e.g., the side surfaces 303a, 303b, 303c, and 303d of FIG. 4) facing outward of the electronic device 300. When viewed from above the first surface 401a, e.g., the first area 410 may include an upper area of the conductive portion 401, and the second area 420 may include a lower area of the conductive portion 401.

FIG. 5 illustrates that the first area 410 and the second area 420 may have the same size and are symmetric vertically with respect to the virtual line L1. However, embodiments are not limited thereto. According to another embodiment, the first area 410 and the second area 420 may not be distinguished by the virtual line L1. According to another embodiment, another area (e.g., a third area (not shown)) may be formed between the first area 410 and the second area 420. As such, various embodiments are applicable. Hereinafter, for convenience of description, the following description focuses primarily on an embodiment in which when the conductive portion 401 is viewed from the front (e.g., refer to FIG. 5(b)), the first area 410 is disposed adjacent to the second area 420.

Referring to FIGS. 4 and 5 together, according to an embodiment, the antenna structure 400 may include a plurality of first slot sets 412 formed to have a first designated gap g2 or g3, along the second direction (direction parallel to the X axis), in the first area 410 among two or more distinct areas of the conductive portion 401. A plurality of openings may be formed in one side of the electronic device (e.g., the electronic device 300 of FIG. 3A). A slot-type antenna supporting a specific frequency band through parameters, such as the length and/or size of the openings, may be implemented. According to an embodiment, the antenna structure 400 may include a plurality of second slot sets 422 formed to have a second designated gap g5 or g6, along the second direction (direction parallel to the X axis), in the second area 420 among two or more distinct areas of the conductive portion 401. The antenna structure 400 and the electronic device (e.g., the electronic device 300 of FIG. 3A) according to various embodiments of the disclosure may set various beam steering ranges of the beam radiated using the antenna structure 400 and support various ranges of frequency bands required in multi-band communication, through the above-described slot configuration.

In an embodiment, the slot set may be a configuration in which two or more slots are combined. Here, "two or more slots are combined" may mean that two or more slots are formed and arranged to have a designated length to support a designated frequency band. FIG. 5 illustrates that one first slot set 411 may include two first slots 411a and 411b. For example, the two first slots 411a and 411b may be spaced apart from each other by a gap g1 along the second direction (e.g., a direction parallel to the X axis). According to another embodiment, FIG. 5 illustrates that one second slot set 421 includes two second slots 421a and 421b. For example, the two second slots 411a and 411b included in the second slot set 421 may be spaced apart by a designated gap g4 along the second direction (e.g., a direction parallel to the X axis).

According to various embodiments of the present disclosure, the first designated gap g2 or g3 between the two different first slot sets 411 and the second designated gap g5 or g6 between the two different second slot sets 421 may have substantially the same gap. Referring to FIG. 5, as the first designated gap and the second designated gap correspond to g2 and g5, respectively, the first slot sets 411 included in the plurality of first slot sets 412 and the second slot sets 421 included in the plurality of second slot sets 422 may be set to have the same gap. In an embodiment, each second slot set 421 included in the plurality of second slot sets 422 may be formed in a position corresponding to the position where each first slot set 411 included in the plurality of first slot sets 412 is formed.

According to various embodiments of the present disclosure, the plurality of first slot sets 412 may form a first array antenna, and the plurality of second slot sets 422 may form a second array antenna. According to an embodiment, each slot set included in the plurality of first slot sets 412 and the plurality of second slot sets 422 may be connected with one feeding line (e.g., the feeding unit 363 of FIG. 10) and operate as a single antenna element. As another example, the plurality of first slot sets 412 and the plurality of second slot sets 422 may have their individual slot sets each connected to a feeding unit 363 and may thus operate as an array antenna. It is possible to radiate beams in a specific direction or specific strength by adjusting the phase of the signal fed to each element included in the array antenna.

According to an embodiment, the antenna structure 400 of the disclosure includes a first array antenna or second array antenna including at least some of the plurality of first slot sets 412 or the plurality of second slot sets 422 arranged in one direction (e.g., a direction parallel to the X axis). Thus, it is possible to radiate antenna beams (e.g., F1 and F2 of FIG. 3A) which may be directed in a specific strength or in a specific direction on a virtual horizontal surface (S1 of FIG. 3A) while having the first steering range (e.g., D1 or D2 of FIG. 3A) of the electronic device (e.g., the electronic device 300 of FIG. 3A). According to another embodiment, since the first antenna array is formed in the first area 410 (e.g., upper side) of the conductive portion 401, and the second antenna array is formed in the second area 420 (e.g., lower side) of the conductive portion 401, it is possible to radiate the antenna beam (e.g., F2 of FIG. 3A) that may be directed in a specific strength or in a specific direction on the virtual vertical surface (e.g., S2 of FIG. 3A) while having the second steering range (e.g., D2 of FIG. 3A) of the electronic device (e.g., the electronic device 300 of FIG. 3).

According to various embodiments of the disclosure, as the first slot set 411 included in the plurality of first slot sets 412 includes a plurality of slots and forms one antenna element, the antenna structure 400 may support a wider frequency band as compared with an embodiment including a single slot. When an antenna element is formed with multiple slots, rather than forming an antenna element with a single slot, the supportable frequency band may be extended. As another example, as at least two or more first slots 411a and 411b included in the first slot set 411 are rendered to have different lengths, it is possible to support a wider frequency band and more finely adjust the frequency band.

According to the embodiment shown in 5, e.g., one first slot set 411 includes two different first slots (hereinafter referred to as "1-1th slot 411a and 1-2th slot 411b"). The 1-1th slot 411a may be formed to have a shorter electrical length than the 1-2th slot 411b. For example, the 1-1th slot 411a may have a length corresponding to the sum of the length a1 and the length a2, and the 1-2th slot 411b may have a length corresponding to the length a3 and the length a4. Referring to FIG. 5(b), FIG. 5(d) and FIG. 5(e), in the cross section of the antenna structure 400, as the length of the 1-1th slot 411a is formed to be different from the length of the 1-2th slot 411b, different cross-sectional structures may be formed in the cross section taken along direction A-A' and the cross section taken along direction B-B'. In this structure, if current flows through the conductive portion 401, one slot among the slots (e.g., the 1-1th slot 411a and the 1-2th slot 411b) having different lengths may operate at a relatively high frequency or low frequency as compared with at least other slots. For example, the 1-1th slot 411a may resonate at a first frequency (e.g., 39 Ghz), and the 1-2th slots 411b may resonate at a second frequency (e.g., 28 Ghz). What has been described above may also be applied to the plurality of second slot sets 422 and at least two or more second slots (e.g., the 2-1th slot 421a and the 2-2th slot 421b) included in one second slot set 421.

Referring to FIGS. 4 and 5, according to an embodiment, the conductive portion 401 may surround the inner space of the electronic device 300 and may include a first surface 401a (e.g., one of the side surfaces 303a, 303b, 303c, and 303d of FIG. 3A) facing outward of the electronic device.

According to various embodiments of the present disclosure, the antenna structure 400 may further include an extension 402 and/or 403 extending from the conductive portion 401 and formed with a surface at least a portion of which faces in a direction different from the direction in which the first surface of the conductive portion 401 faces. The extension 402 and/or 403 may be formed only at either one end or the other end of the conductive portion 401, or alternatively, may be formed on both the one end and the other end of the conductive portion 401. For example, the extension 402 and/or 403 may include a first extension 402 formed with a second surface 402a extending from the conductive portion 401 and at least a portion of which faces in a direction different from the direction in which the first surface 401a faces and/or a second extension 403 formed with a third surface 403a extending from the conductive portion 401 and at least a portion of which faces in a direction different from the direction in which the first surface 401a faces. The first extension 402 and/or the second extension 403 may extend integrally from the conductive portion 401 according to an embodiment.

According to an embodiment, the antenna structure 400 may include the conductive portion 401, the first extension 402, or the second extension 403 and may have an approximately "C" shape in cross section.

According to an embodiment, the first area 410 may be formed over at least a portion of the conductive portion 401 and the first extension 402. For example, the first area 410 may include a 1-1th area 410a of the conductive portion 401 and a 1-2th area 410b of the first extension 402. According to another embodiment, the second area 420 may be formed over at least a portion of the conductive portion 401 and the second extension 403. For example, the second area 420 may include a 2-1th area 420a of the conductive portion 401 and a 2-2th area 420b of the second extension 403. According to an embodiment, the first slot set 411 may extend from one end of the conductive portion 401 through the bent portion to at least a portion of the first extension 402. As another example, the second slot set 421 may extend from the other end of the conductive portion 401 through the bent portion to at least a portion of the second extension 403.

According to the embodiment shown in FIG. 5, the 1-1th slot 411a and the 1-2th slot 411b spaced apart from each other by a gap g1 in the second direction (e.g., a direction parallel to the X axis) in the conductive portion 401 may include portions 411aa and 411ba, respectively, extending in the first direction (e.g., a direction parallel to the Z axis or the height direction of the antenna structure). Further, the 2-1th slot 421a and the 2-2th slot 421b may also include portions 421aa and 421ba, respectively, extending in the first direction (e.g., a direction parallel to the Z-axis). As another example, the first slots 411a and 411b and the second slots 421a and 421b may extend on the first extension 402 and the second extension 403 in the third direction (e.g., a direction parallel to the −Y axis). According to the embodiment shown in FIG. 5, the 1-1th slot 411a and the 1-2th slot 411b may include portions 411ab and 411bb, respectively, extending on the first extension 402 in the third direction (e.g., a direction parallel to the −Y axis), parallel to each other. The 2-1th slot 421a and the 2-2th slot 421b may include portions 421ab and 421bb extending on the second extension 403 in the third direction, parallel to each other.

According to various embodiments of the present disclosure, at least a portion of the first slots 411a and 411b may further extend on the first extension 402 in the fourth direction (e.g., a direction parallel to the −X axis), and at least a portion of the second slots 421a and 421b may further extend on the second extension 403 in a direction (e.g., a direction parallel to the X direction) opposite to the fourth direction. For example, as illustrated in FIG. 5, the 1-2th slot 411b may further include a portion 413 bent and further extending in the fourth direction (e.g., a direction parallel to the −X axis direction), from an end of the portion 411bb extending in the third direction (e.g., a direction parallel to the −Y axis). The 2-2th slot 421b may further include a portion 423 bent and further extending in the direction opposite to the fourth direction, (e.g., a direction parallel to the X axis direction), from an end of the portion 421bb extending in the third direction (e.g., a direction parallel to the −Y axis).

As further extending portions 413 and 423 are included, it is possible to expand the frequency band through the extension of the first slots 411a and 411b and the second slots 421a and 421b within a limited space. For example, the antenna structure 400 according to the embodiment shown in FIG. 5 may support various frequency bands due to various slots having parameters h, d1, d2, a1, a2, a3, a4, b1, g1, g2 and/or g3. According to an embodiment, since the antenna structure 400 further includes parameter b2 indicating the further extending portions 413 and 423 in addition to the above-described parameters h, d1, d2, a1, a2, a3, a4, b1, g1, g2, and/or g3, it is possible to secure a length necessary for frequency output in a lower band (e.g., a band lower than 28 GHz).

According to an embodiment, the second slot set 421 formed in a position corresponding to the first slot set 411 may have a shape symmetric (e.g., line symmetry) with the first slot set 411 with respect to the virtual line L1 passing through the center of the conductive portion 401. For example, the second slot set 421 may be formed in the −Z direction of the first slot set 411 when viewed from above the first surface 401a and, although not shown in FIG. 5, the second slot set 421 may be symmetric with the first slot set 411 with respect to the virtual line L1 unlike shown in the drawings.

According to another embodiment, as in the embodiment shown in FIG. 5, the second slot set 421 formed in the position corresponding to the first slot set 411 may have a shape symmetric (e.g., point symmetry) with the first slot set 411 with respect to a designated point in the virtual line L1 passing through the center of the conductive portion 401. According to this, unlike in the above-described embodiment (e.g., line symmetry), the second slot set 421 may have a symmetric shape and arrangement position to overlap the first slot set 411 when turned at 180 degrees about the designated point. The staggered arrangement between the first slot set 411 and the second slot set 421 is described below in detail with reference to FIGS. 6A to 7B.

According to various embodiments of the present disclosure, each of the first slot set 411 and the second slot set 421 may include, e.g., two slots as shown in the drawings. However, embodiments are not necessarily limited thereto, and three slots, four slots, or five or more slots may be provided. In an embodiment, the slots included in the first set of slots 411 may extend in various designated directions (e.g., a direction parallel to the −Y axis and/or Z axis and a direction parallel to the X axis or −X axis).

With respect to the first designated gap g2 or g3, an example in which four first slot sets 412 are provided as shown in FIGS. 4 and 5 is described. The four first slot sets 412 may be formed with the same gap. However, without being limited thereto, the slot sets may be formed with different gaps. For example, the four first slot sets 412 may be formed with different gaps. The above description may also be applied to a description of the second designated gap g4 or g5 of the plurality of second sets 422.

FIG. 5 illustrate that the respective widths b1 of the first slots 411a and 411b are identical to each other. However, the first slots 411a and 411b may have different widths. According to various embodiments of the present disclosure, all of the first slots 411a and 411b are illustrated to have the same rectangular shape, but may be formed to have different shapes. The above description may be applied to a description of the second slots 421a and 421b.

According to various embodiments of the present disclosure, the 1-2th slot 411b included in the first slot set 411 not only extends from the first area 410 but also extends through the virtual line L1 up to the second area 420. Correspondingly thereto, the 2-2th slot 421b included in the second slot set 421 may also extend through the virtual line L1 up to the first area 410. This is described below in further detail with reference to FIGS. 6A to 7B.

Figure 6A:
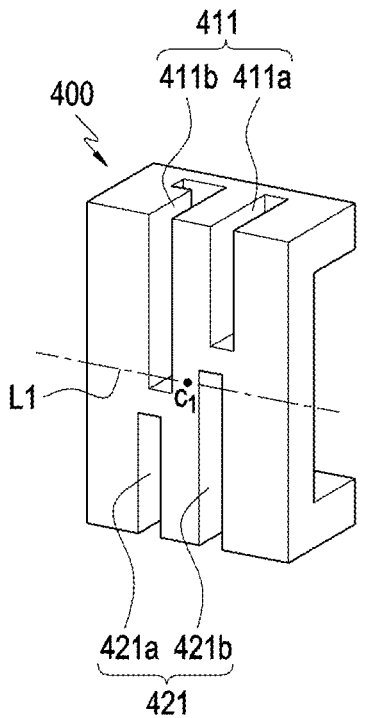
FIG. 6A is a view illustrating a first slot set and a second slot set included in an antenna structure according to an embodiment of the present disclosure.
Figure 6B:
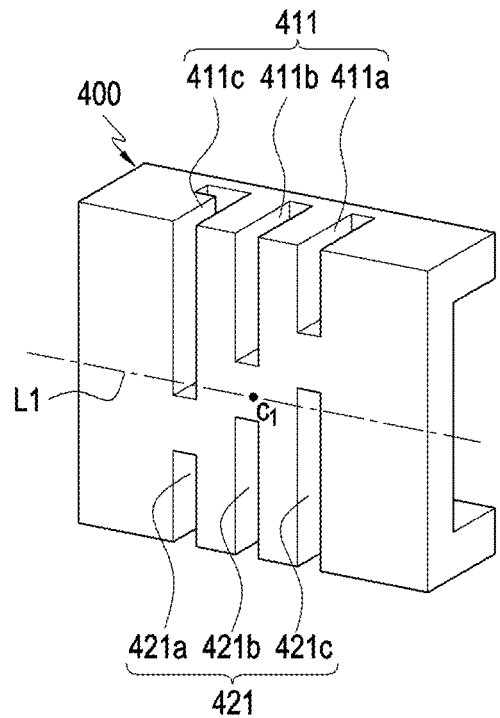
FIG. 6B is a view illustrating a first slot set and a second slot set included in an antenna structure according to embodiment of the present disclosure.
Figure 6C:
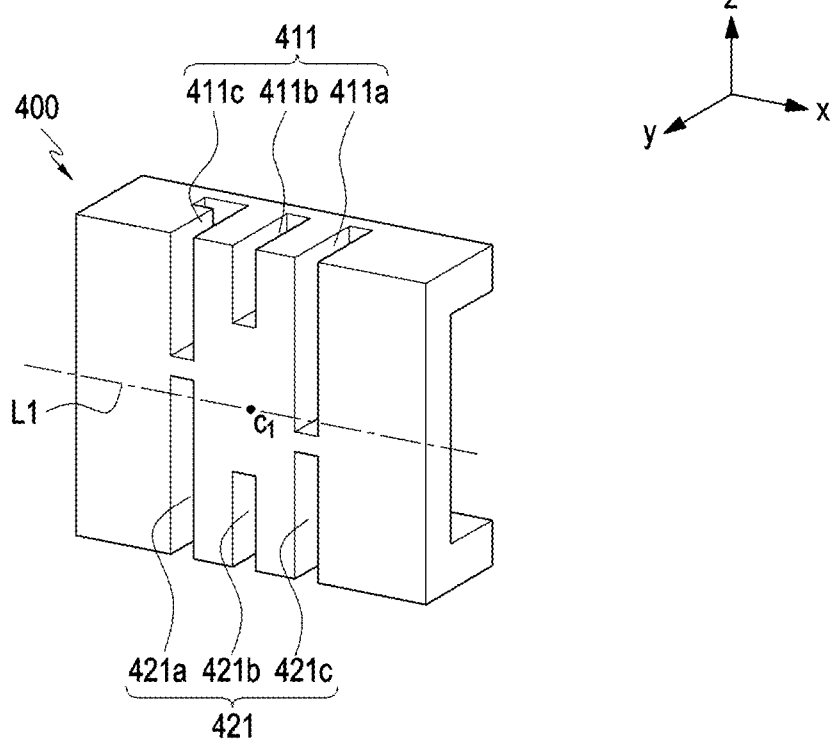
FIG. 6C is a view illustrating a first slot set and a second slot set included in an antenna structure according to embodiment of the present disclosure.
Figure 7A:
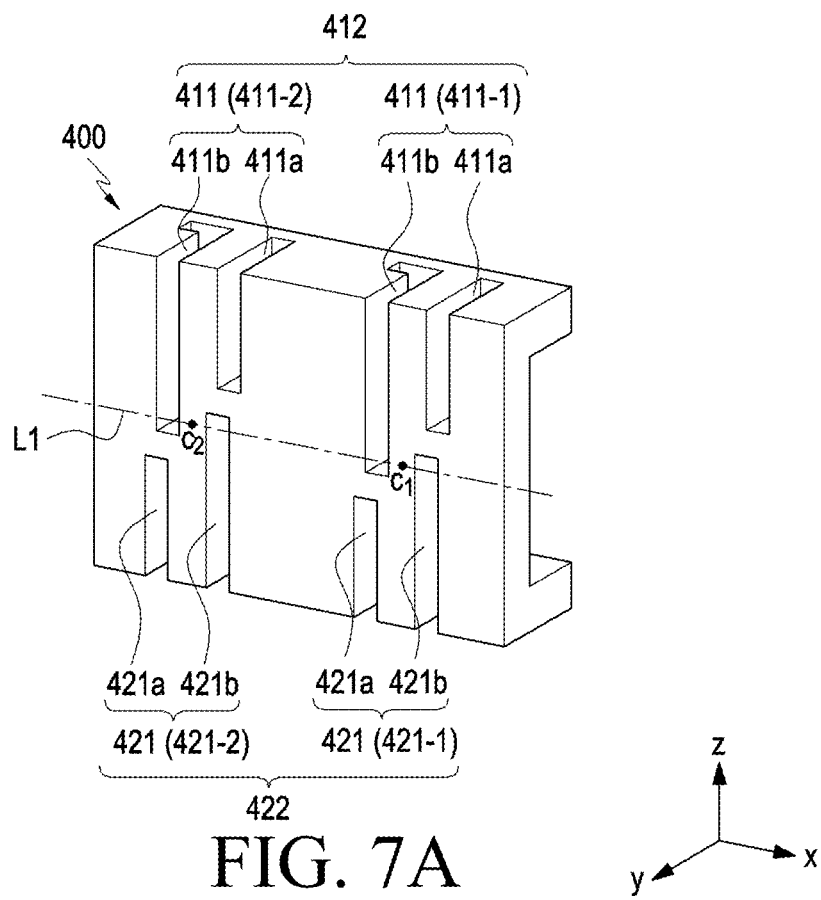
FIG. 7A is a view illustrating a plurality of first slot sets and a plurality of second slot sets included in an antenna structure according to an embodiment of the present disclosure.

FIG. 6A is a view illustrating a first slot set 411 and a second slot set 421 included in an antenna structure according to an embodiment of the present disclosure. FIG. 6B is a view illustrating a first slot set 411 and a second slot set 421 included in an antenna structure according to another embodiment. FIG. 6C is a view illustrating a first slot set 411 and a second slot set 421 included in an antenna structure according to another embodiment. FIG. 7A is a view illustrating a plurality of first slot sets 412 and a plurality of second slot sets 422 included in an antenna structure according to an embodiment. FIG. 6B is a view illustrating a first slot set 412 and a second slot set 422 included in an antenna structure according to another embodiment.

According to the embodiment shown in FIG. 6A, an antenna structure 400 may include first slots 411a and 411b in a first slot set 411 and second slots 421a and 421b in a second slot set 421. According to the embodiment shown in FIGS. 6A and 6C, the first slot set 411 may include first slots 411a, 411b, and 411c, and the second slot set 421 may include second slots 421a, 421b, and 421c. In an embodiment, as shown in FIG. 6A, the first slots 411a, 411b, or 411c or the second slots 421a, 421b, and 421c may include three slots, and the three slots are formed to have different lengths. As another example, a certain slot (e.g., the 1-3th slot 411c) may be formed with a portion (e.g., the extension 413 or 423 of FIG. 5) further extending in the fourth direction (e.g., a direction parallel to the −X axis). In an embodiment, in the antenna structure 400, when the first slot set 411 is formed with two first slots 411a and 411b, the two first slots 411a and 411b may operate as one antenna element. When the first slot set 411 is formed with three first slots 411a, 411b, and 411c, the three first slots 411a, 411b, and 411c may operate as a single antenna element.

As comparison between FIGS. 6A and 6C, in the antenna structure 400 in which the first slot set 411 includes three first slots 411a, 411b, and 411c, and the second slot set 421 includes three second slots 421a, 421b, and 421c, the shape of the first slot set 411 and the second slot set 421 may be varied depending on the arrangement order of the slots and/or the length, according to embodiments.

According to what is shown in FIGS. 6A to 6C, the second slot set 421 formed in the position corresponding to the first slot set 411 may have a shape symmetric (e.g., point symmetry) with the first slot set 411 with respect to a designated point C1 in the virtual line L1 passing through the center of the conductive portion 401. For example, the second slot set 421 may have a shape point-symmetric with the first slot 411 with respect to the point C1.

Figure 7B:
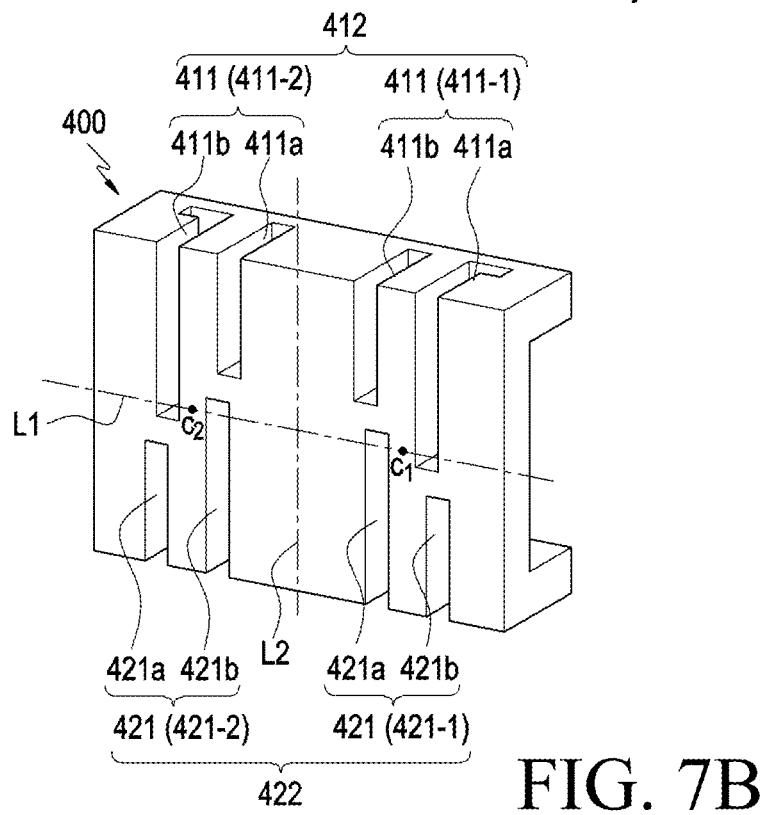
FIG. 7B is a view illustrating a plurality of first slot sets and a plurality of second slot sets included in an antenna structure according to embodiment of the present disclosure.

Referring to the embodiment shown in FIGS. 7A and 7B, the antenna structure 400 may include a 1-1th slot set 411-1 and/or a 1-2th slot set 411-2 as the first slot set 411, and the second slot set 421 may include a 2-1th slot set 421-1 or a 2-2th slot set 421-2 corresponding to the first slot set 411. For example, the 1-1th slot set 411-1, the 1-2th slot set 411-2, the 2-1th slot set 421-1, and the 2-2th slot set 421-2 each may have two slots and may operate as an antenna element. For example, the array antenna of FIG. 7 may represent a 2×2 array antenna. Here, the first slot sets 411-1 and 411-2 may correspond to the second slot sets 421-1 and 421-2, respectively.

The difference between the embodiments shown in FIGS. 7A and 7B lies in that, in FIG. 7A, the combination of the 1-1th slot set 411-1 and the corresponding 2-1th slot set 421-1 and the combination of the 1-2th slot set 411-2 and the corresponding 2-2th slot set 421-2 have the same shape and arrangement and are formed side by side along a second designated direction (e.g., a direction parallel to the X-axis) while in FIG. 7B, the combination of the 1-1th slot set 411-1 and the corresponding 2-1th slot set 421-1 and the combination of the 1-2th slot set 411-2 and the corresponding 2-2th slot set 421-2 are formed symmetrically left/right with respect to the virtual line L2. According to another embodiment, in FIG. 7B, the combination of the 1-1th slot set 411-1 and the corresponding 2-1th slot set 421-1 may be symmetrical with respect to the designated point C1, and the combination of the 1-2th slot set 411-2 and the corresponding 2-2th slot set 421-2 may be symmetrical with respect to the designated point C2.

As such, various embodiments of the present disclosure may be applied regarding forming one slot set with multiple slots.

According to various embodiments of the present disclosure, if a feeding line is connected to a plurality of slot sets, it may be referred to as an array antenna. For example, when connected with a feeding line, the plurality of first slot sets 412 may be referred to as a first array antenna, and the plurality of second slot sets 422 may be referred to as a second array antenna.

Figure 8:
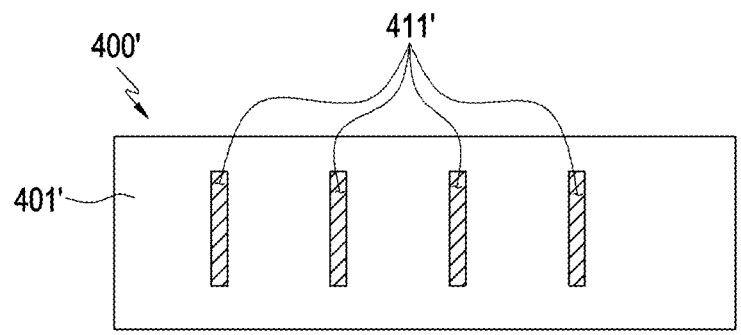
FIG. 8 is a view illustrating an antenna structure in which an array antenna is formed according to an embodiment of the present disclosure.
Figure 9:
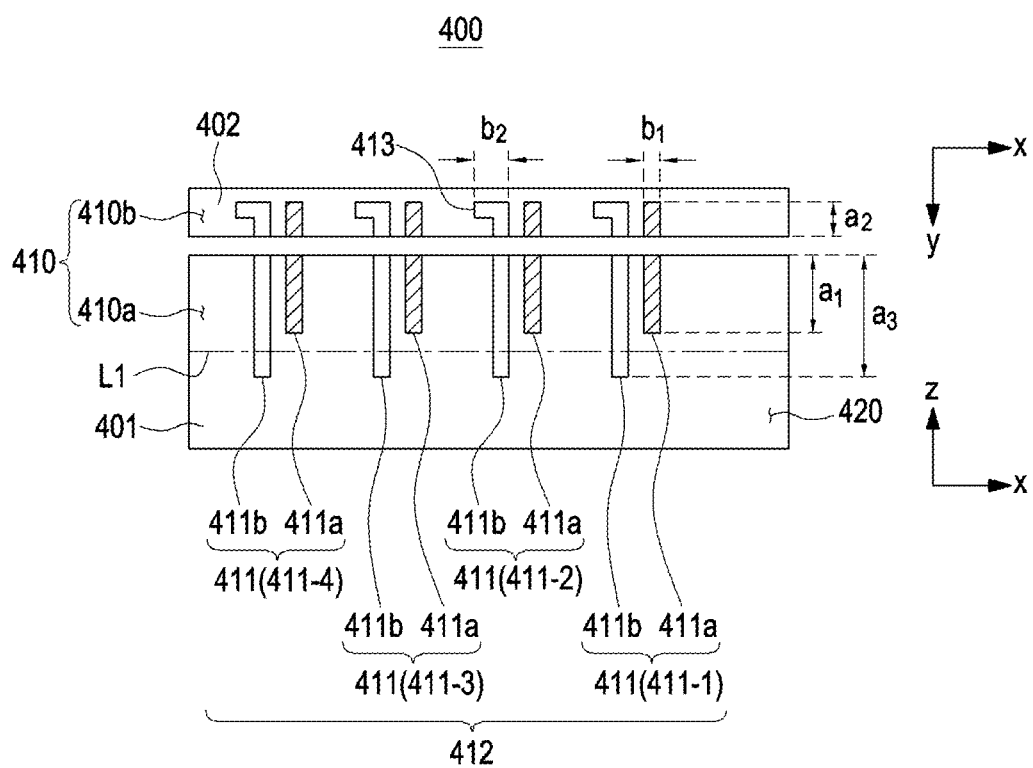
FIG. 9 is a view illustrating an antenna structure in which an array antenna is formed according to various embodiments of the disclosure of the present disclosure.

FIG. 8 is a view illustrating a state in which a plurality of antenna elements form an array antenna in an antenna structure 400' according to an embodiment of the present disclosure. FIG. 9 is a view illustrating an antenna structure 400 in which an array antenna is formed according to various embodiments of the disclosure of the present disclosure.

Referring to FIG. 8, according to some embodiments, in an array antenna (e.g., a single slot antenna array) 411', antenna elements may extend in a straight line on a plane 401' (e.g., conductive portion 401 of FIG. 5) and may be arranged in parallel along a series of directions. The array antenna 411' may radiate a beam toward the outside of the electronic device (e.g., the electronic device 300 of FIG. 3A). Using this, the electronic device may steer the beam on the virtual plane of the electronic device as described above in connection with FIGS. 3A and 3B. According to various embodiments of the present disclosure, through the slot-type antenna shown in FIG. 8, the electronic device may partially steer beams on a virtual horizontal surface (S2 of FIG. 3A) of the electronic device as well as on a virtual vertical surface (S1 of FIG. 3A). However, such a structure may not meet the requirement to support a wider frequency band in practice.

According to various embodiments of the disclosure, as described above in connection with FIG. 5, the array antennas (e.g., the first array antenna 412 and the second array antenna 422) may be formed in the first area 410 and the second area 420 to secure a wide beam steering range not only on the virtual horizontal surface (S1 of FIG. 3A) of the electronic device but also on the virtual vertical surface (S2 of FIG. 3A).

Referring to FIG. 9, the first slot sets 411-1, 411-2, 411-3, and 411-4 included in the plurality of first slot sets 412 may be arranged side by side in one direction (e.g., a direction parallel to the X axis) in the first area 410 of the conductive portion 401. When power is supplied to the plurality of first slot sets 412 through a feeding line (e.g., the feeding unit 363 of FIG. 10 to be described below), it may operate as a first array antenna. According to various embodiments of the disclosure, not simply is formed the first array antenna in which the plurality of first slot sets 412 are arranged at designated gaps, but the first slot sets 411 may also include a plurality of first slots 411a and 411b.

Further, the plurality of first slots 411a and 411b may be configured with various lengths or widths. For example, the embodiment of FIG. 8 discloses an array antenna 411' in which four single slots are arranged in parallel in a series of directions. On the contrary, in the embodiment shown in FIG. 9, one first slot set 411 may be formed with the 1-1th slot 411a or the 1-2th slot 411b, and a plurality of first slot sets 412 may be gathered and, when supplied power through a feeding line (e.g., the feeding unit 363 of FIG. 10 described below), operate as the first array antenna.

Referring to FIG. 9, according to various embodiments of the disclosure, the antenna structure 400 has a plurality of first slot sets 412 formed on the conductive portion 401, and at least some slots of the plurality of first slot sets 412 extend up to at least one extension (e.g., the first extension 402). Thus, it is possible to easily secure a wider beam radiation range on the virtual vertical surface S2 of the electronic device (e.g., the electronic device 300 of FIG. 3A). As described above with reference to FIG. 5, the conductive portion 401 of the side surface member 303 in which the plurality of first slot sets 412 are formed may include a first area 410 and a second area 420 arbitrarily divided with respect to the virtual line L1. For example, the first area 410 may include a 1-1th area 410a of the conductive portion 401 and a 1-2th area 410b of the first extension 402. The first slot set 411 included in the plurality of first slot sets 412 may extend up to, e.g., the 1-2th area 410b of the first extension 402 as well as the 1-1th area 410a of the conductive portion 401.

According to an embodiment, the width of the 1-1th slot 411a or the 1-2th slot 411b included in the first slot set 411 may be set to be substantially the same, but may vary according to embodiments. For example, the 1-1th slot 411a and the 1-2th slot 411b may have the same width "b1" or may have various sizes.

According to an embodiment, the length of the 1-1th slot 411a or the 1-2th slot 411b included in the first slot set 411 may be set in various ways. For example, the length of the 1-1th slot 411a may be set to "a1+a2," and the length of the 1-2th slot 411b may be set to "a3+a2." According to an embodiment, the length a3+a2 of the 1-2th slot 411b may be extended longer than the length a1+a2 of the 1-1th slot 411a. As another example, the 1-2th slot 411b formed in the 1-2th area 410b of the first extension 402 may further include a portion 413 bent and extending to one side. As the extending portion 413 is included, at least a portion of the 1-2th slot 411b may be formed with the width "b2," rather than "b1," and, in this case, the length of the 1-2th slot 411b may be extended to "a3+a2+(b2−b1)."

Accordingly, the array antenna 412 according to the embodiment shown in FIG. 9 may support more diverse and wider frequency bands than the array antenna 411' shown in FIG. 8.

As at least one of the plurality of slots included in the first slot set 411 extends up to the second area 420, not the first area 410, it is possible to provide a structure advantageous to support more various and wider frequency bands. For example, a portion of the 1-2th slot 411b formed on the conductive portion 401 may extend beyond the 1-1th area 410a up to the second area 420. The structure of the plurality of first slot sets 412 described above with reference to FIG. 9 may be applied to the plurality of second slot sets 422.

According to various embodiments of the present disclosure, the electronic device 300 may further include a cover member (e.g., a rear plate) or a display member (e.g., the display member of FIG. 3A) that covers at least a portion of the first area 410 or the second area 420. The cover member may be formed, e.g., by coated or colored glass, ceramic, polymer, metal, or a combination of at least two thereof. According to this, at least one first slot 411 formed in the first area 410 or at least one second slot 421 formed in the second area 420 may be not visible to the outside but hidden by the cover member (e.g., the rear plate) or the display member (e.g., the display member 311 of FIG. 3A).

According to an embodiment, when the cover member includes at least some metal, care may be taken of the slots positioned in the first area 410 or the second area 420 considering the arrangement relationship with the cover member and radiation performance. According to various embodiments of the present disclosure, a recess portion to which the first extension 402 or the second extension 403 is fastened may be formed in the cover member (e.g., the rear plate) or the display member (e.g., the display member 311 of FIG. 3A) covering at least a portion of the first area 410 or the second area 420 of the electronic device 300, thereby rendering it possible to reduce deterioration of radiation performance while increasing the stiffness of the electronic device (e.g., the electronic device 300 of FIG. 3A).

According to various embodiments of the present disclosure, the dimensions a1, a2, a3, a4, b1, b2, g1, g2, g3, d1, d2, h, w1, w2, c1, c2, c3, and r of the components shown in FIG. 10 described below, as well as FIGS. 5 to 9 may be variously designed according to embodiments of the present disclosure.

Figure 10A:
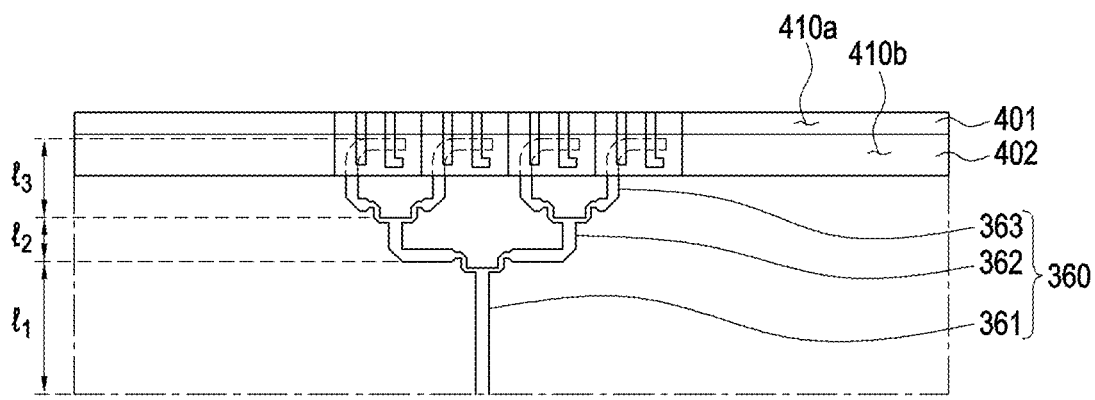
FIG. 10A is a view illustrating the appearance of an antenna structure and conductive lines according to an embodiment of the present disclosure.
Figure 10B:
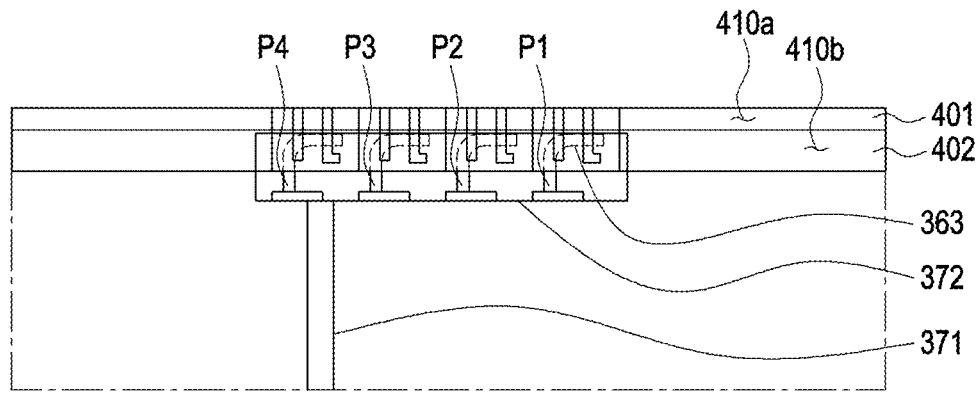
FIG. 10B is a view illustrating the appearance of an antenna structure and conductive lines according to embodiment of the present disclosure.
Figure 10C:
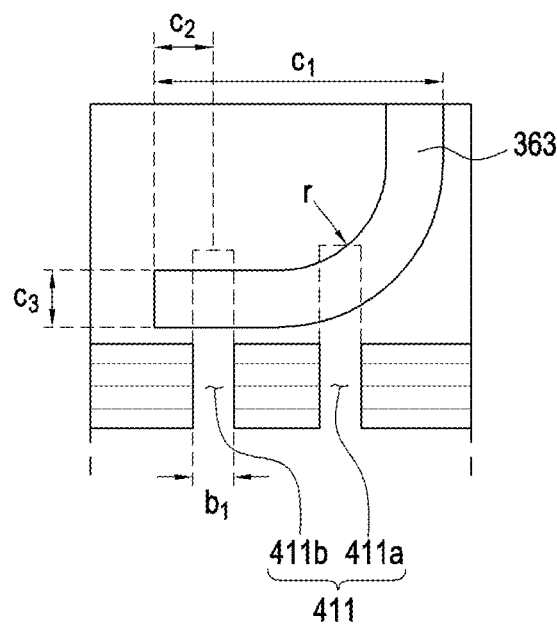
FIG. 10C is a view illustrating the appearance of an antenna structure and conductive lines according to embodiment of the present disclosure.

FIGS. 10A to 10C are views illustrating the antenna structure 400 and the first feeding unit 360 according to various embodiments of the present disclosure. FIG. 10A schematically illustrates the first feeding unit 360 physically connected with a plurality of first slot sets 412. FIG. 10B illustrates an embodiment different from the embodiment of FIG. 10A with respect to the plurality of first slot sets 412. FIG. 10C is an enlarged view illustrating an example in which a feeding unit 363 is disposed adjacent to one first slot set 411.

It should be noted that the first feeding line 360 according to the embodiment shown in FIGS. 10A, 10B, and 10C is merely exemplified for convenience of description. The first feeding line 360 according to the embodiment shown in FIGS. 10A, 10B, and 10C may include a conductive path and a feeding unit 363 (e.g., micro strip) different from those shown in the drawings. A state in which a first feeding line 360 is connected to the antenna structure 400 may be described focusing on the first area (e.g., the first area 410 of FIG. 5) of the antenna structure 400, with reference to the embodiment shown in FIGS. 10A, 10B, and 10C. Referring to FIG. 10A, according to an embodiment, a first feeding line 360 may be electrically connected to a plurality of first slot sets 412.

For example, the first feeding line 360 may form an individual connection path and/or feeding unit for each first slot set 411 included in the plurality of first slot sets 412. According to an embodiment, the feeding unit 363 disposed at an end of the first feeding line 360 may be disposed adjacent to the first extension 402 and/or the conductive portion 401 in which the plurality of first slot sets 412 are formed. The feeding unit 363 may be electrically connected to the plurality of first slot sets 412 by various feeding schemes including a coupling feeding scheme or a feeding scheme of touching the contacts around the slots.

According to various embodiments of the present disclosure, the first feeding line 360 may include one or more branched conductive lines 361, 362, and 363. In FIG. 10A, the lengths l1, l2, and l3 of the branched conductive lines 361, 362, and 363 are slightly exaggerated for convenience of description. However, in practice, the lengths may be very short (e.g., about 0.1λ to about 1.5λ when the resonant frequency of millimeter wave is "λ"). The lengths l1, l2, and l3 of the first feeding line 360 may be designed to minimize propagation loss considering changes in impedance depending on relative positions between the RF circuit (e.g., RFIC), each antenna element (e.g., the first slot set 411) and the antenna structure 400 including the same.

FIG. 10A may illustrate an embodiment of the first feeding line 360 and may illustrate an embodiment in which the branched conductive lines 361, 362, and 363 are physically connected to each antenna element (e.g., the first slot set 411) included in the plurality of first slot sets 412.

According to an embodiment, each first slot set 411 included in the plurality of first slot sets 412 may be connected with branched conductive lines 361, 362, and 363 to be able to apply a signal to radiate an antenna beam of a designated frequency band to the first slot sets 411 and may thereby be fed power as shown in FIG. 10(a). For example, power may be fed so that the communication signal flowing through at least some conductive lines of the first feeding line 360 has a first phase, and the communication signal flowing through other conductive lines of the first feeding line 360 has a second phase. According to an embodiment, the lengths of the conductive lines may be adjusted to change the phase of the signal applied by the communication signal. For example, to supply power to have the second phase different from the first phase, the lengths of the conductive lines to which the second phase of signal is applied may be extended to be longer than the lengths of the conductive lines to which the first phase of signal is applied.

Further, according to an embodiment, as a feeding unit for independently applying a different signal is provided for each first slot set 411 included in the plurality of first slot sets 412, independent power feeding may be performed.

According to an embodiment, as shown in FIG. 10B, a feeding unit 363 may be disposed to apply a signal to each of the first slot sets 411. In an embodiment, a plurality of feeding units 363 may be connected to ports (e.g., P1, P2, P3, and P4), respectively, of the substrate 372. According to an embodiment, the feeding unit 363 may be formed in a pattern shape on one surface of the substrate 372. According to another embodiment, a communication circuit (e.g., RFIC) may be disposed on at least a portion of the substrate 372 (a rear surface of the substrate 372 that is invisible in FIG. 10B).

According to various embodiments of the present disclosure, a phase shifter may be provided on the substrate 372, in a communication circuit (e.g., an RFIC) disposed on at least a portion of the substrate 372, or a communication circuit (e.g., an RFIC) outside the substrate 372 (in a case where no communication circuit is disposed on the substrate 372) and may thereby apply signals with different phases to the first slot sets 411. A connector 371 (e.g., a conductive line or FPCB) for connecting with the main board disposed inside the electronic device (e.g., the electronic device 300 of FIG. 3A) may be connected to the substrate 371. By the above-described configuration, a signal with a different phase may be transferred to each slot (or each slot set), and it may thereby be possible to form an antenna structure 400 to form beams in various directions.

For example, communication signals with a first phase may be applied to the plurality of first slot sets 412 using at least some of the plurality of feeding units 363, and communication signals with a second phase may be applied to the plurality of first slot sets 412 using others of the plurality of feeding units 363. According to various embodiments of the present disclosure, the phase difference between the feeding units 363 may be controlled. Thus, the antenna structure 400 and the electronic device (e.g., the electronic device 300 of FIG. 3A) may form beams in various directions. The above-described embodiments may also be applied where a plurality of second slot sets 422 are formed in the second area (e.g., the second area 420 of FIG. 5) of the antenna structure 400 and are connected with a second feeding line (not shown).

According to various embodiments of the present disclosure, when the antenna structure 400 includes a plurality of first slot sets 412 and a plurality of second slot sets (e.g., the plurality of second slot sets 422 of FIG. 4), the first feeding line 360 and the second feeding line (not shown) may perform power feeding operations independent from each other.

According to an embodiment, the plurality of conductive lines included in the first feeding line 360 may enable power feeding with a single pole double through (SPDT) switching structure. According to another embodiment, the second feeding line (not shown) separately provided from the first feeding line 360 may also enable power feeding with a single pole double through (SPDT) switching structure. Here, the first feeding line 360 and the second feeding line (not shown) each may be configured to be directly connected to a communication circuit, such as an RFIC. The first feeding line 360 and the second feeding line (not shown) may also be designed to be hybrid beamformed by integrating direct connections with the SPDT or RFIC. Thus, it is possible to implement massive multi-input multi-output (massive MIMO) or full dimensional MIMO (FD-MIMO)

communication or diversity (spatial diversity), described below, according to the environment of the communication channel.

According to various embodiments of the present disclosure, the antenna element (e.g., the first slot set 411 and the feeding line (e.g., the first feeding line 360)) may be included in the antenna structure 400.

FIG. 10C illustrates that the first slot set 411 may include at least two or more slots 411a and 411b, and the first slot set 411 is formed over the conductive portion 401 and the first extension 402. According to an embodiment, as shown in FIG. 10C, a portion of the first slot set 411 extending on the first extension 402 and at least a portion of the feeding unit 363 may form a coupling structure. For example, the "coupled" feeding unit 363 illustrated in FIG. 10C may be bent and extended so as to be disposed within the antenna structure 400 by a designated width c1, and it may be formed to have a designated width c3 and disposed to be coupled with the slots included in the first slot set 411. As another example, the feeding unit 363 may be formed to further extend by a designated distance c2. As another example, when the feeding unit 363 is bent and extended, the feeding unit 363 may have a predetermined curvature (e.g., r).

According to an embodiment, the power feeding unit 363 may be designated in various shapes. For example, an end of the feeding unit 363 may have an arc shape or a rod shape as shown in FIG. 10(c).

Figure 11:
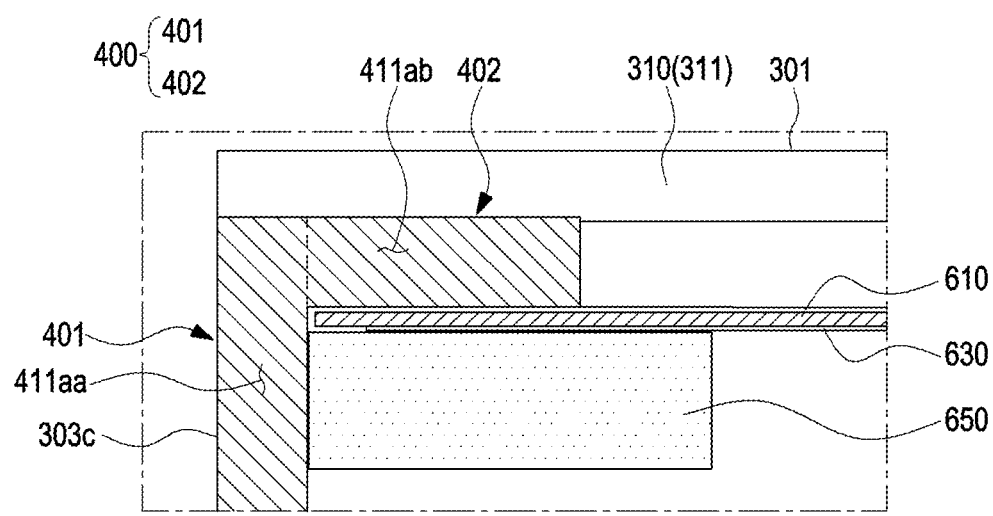
FIG. 11 is a view illustrating a connection structure between an antenna structure and a circuit board according to various embodiments of the present disclosure.
Figure 12:
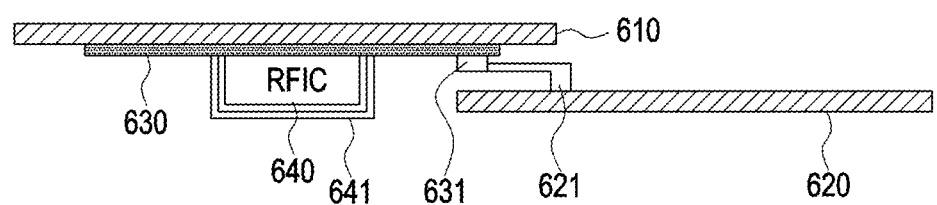
FIG. 12 is a view illustrating a configuration of a circuit board including a 5G module according to various embodiments of the present disclosure.

FIG. 11 is a view illustrating a connection structure between an antenna structure 400 and a first circuit board 610 according to various embodiments of the present disclosure. FIG. 12 is a view illustrating a configuration of a circuit board including a 5G module according to various embodiments of the present disclosure.

According to an embodiment, a feeding line (e.g., the first feeding line 360 of FIG. 10) may include a conductive path 630 formed on the first circuit board 610. A communication circuit (e.g., RFIC) may be disposed on the first circuit board 610. The conductive path 630 (e.g., the feeding unit 363 of FIG. 10) may have a patterned wiring shape and may be designed to have a microstrip line or a substrate integrated waveguide (SIW) shape.

Referring back to FIG. 11, the antenna structure 400 may include a conductive portion 401 facing a first surface 401a and a first extension 402 facing a second surface (e.g., the second surface 402a of FIG. 5) facing in a direction different from the first surface 401a (and/or a second extension (e.g., the second extension 403 of FIG. 5) facing a third surface (e.g., the third surface 403a of FIG. 5)). The first circuit board 610 may be connected to the first extension 402 (and/or the second extension (e.g., the second extension 403 of FIG. 5)), rather than the conductive portion 401.

According to various embodiments of the present disclosure, at least a portion (the extending portions 411aa and 411ab of the 1-1th slot) of the first slot set 411 may be formed over the conductive portion 401 and the first extension 402. According to an embodiment, the first slot set 411 may be filled with a dielectric material (e.g., a polymer material).

According to various embodiments of the present disclosure, the electronic device (e.g., the electronic device 300 of FIG. 3A) including the antenna structure 400 may further include a fixing portion 650 inside the housing 310. The fixing portion 650 may include, e.g., an injection fixing portion or a typical bracket. The fixing portion 650 may be disposed adjacent to an inner surface (e.g., a surface opposite to the first surface 303c) of the antenna structure 400 (e.g., an inner surface of the conductive portion 401) and may be disposed adjacent to a lower portion of the first circuit board 610. The antenna structure 400 and/or the circuit board may be stably supported from the bottom through the fixing portion 650.

Referring to FIGS. 11 and 12 together, the electronic device 300 may include a first circuit board 610 (e.g., the circuit board of the third antenna module 246) on which at least one conductive path 630 is formed and a second circuit board 620 connected with the first circuit board 610 through connection units 621 and 631 (e.g., a coaxial cable or FPCB). According to an embodiment, a communication circuit 640 (e.g., the third RFIC 226) may be mounted to a position adjacent to the antenna structure 400 to reduce propagation path loss.

According to various embodiments of the present disclosure, the first circuit board 610 may be an auxiliary circuit board having a structure (e.g., a cavity backed model) that shields the communication circuit 640 off through a shield can 641. According to an embodiment, the communication circuit 640 may include various amplifiers for increasing transmission/reception signal quality, filter circuits, or phase shifter circuits for phase difference feeding. In an embodiment, the second circuit board 620 may be a main circuit board on which the processor 120 for controlling the signal flow of the communication circuit 640 is mounted.

According to various embodiments of the disclosure, as the conductive portion 401 and the first extension 402 (and/or the second extension (the second extension 403 of FIG. 5)) extending from the conductive portion 401 are formed, it is possible to connect the first circuit board 610, on which at least one conductive path 630 and the communication circuit (e.g., RFIC) are provided, to the first extension 402 (and/or the second extension (e.g., the second extension 403 of FIG. 5)). According to an embodiment, the first extension 402 of the antenna structure 400 may be coupled with the first circuit board 610 on which the communication circuit (e.g., RFIC) is provided and one conductive path 630 and may be fed power.

According to various embodiments of the present disclosure, the first circuit board 610 shown in FIG. 12 may be disposed to face the inner surface of the first conductive portion 401 (e.g., a face facing away from the first surface 303c), shown in FIG. 11. In this case, considering the mounting positions between components in the electronic device and interference between electronic components, the connection units 621 and 631 may extend long inside the electronic device.

Referring to the embodiments shown in FIGS. 9 to 12, it is possible to perform various array antenna modes using the antenna structure 400 according to various embodiments of the disclosure. According to various embodiments of the present disclosure, when a plurality of first slot sets 412 are formed in the first area 410, and a plurality of second slot sets 422 are formed in the second area 420, it is possible to form beams in various directions by diversifying coupling feeding methods by the first feeding line 360 and the second feeding unit (not shown).

According to an embodiment, a first array mode may be performed through the plurality of first slot sets 412 by feeding the first feeding line 360. According to another embodiment, a second array mode may be performed through the plurality of second slot sets 422 by feeding the second feeding line (not shown). According to another embodiment, a third array mode may be performed through the plurality of first slot sets 412 and the plurality of second slot sets 422 by feeding the first feeding line 360 and the second feeding line (not shown) together.

Figure 13A:
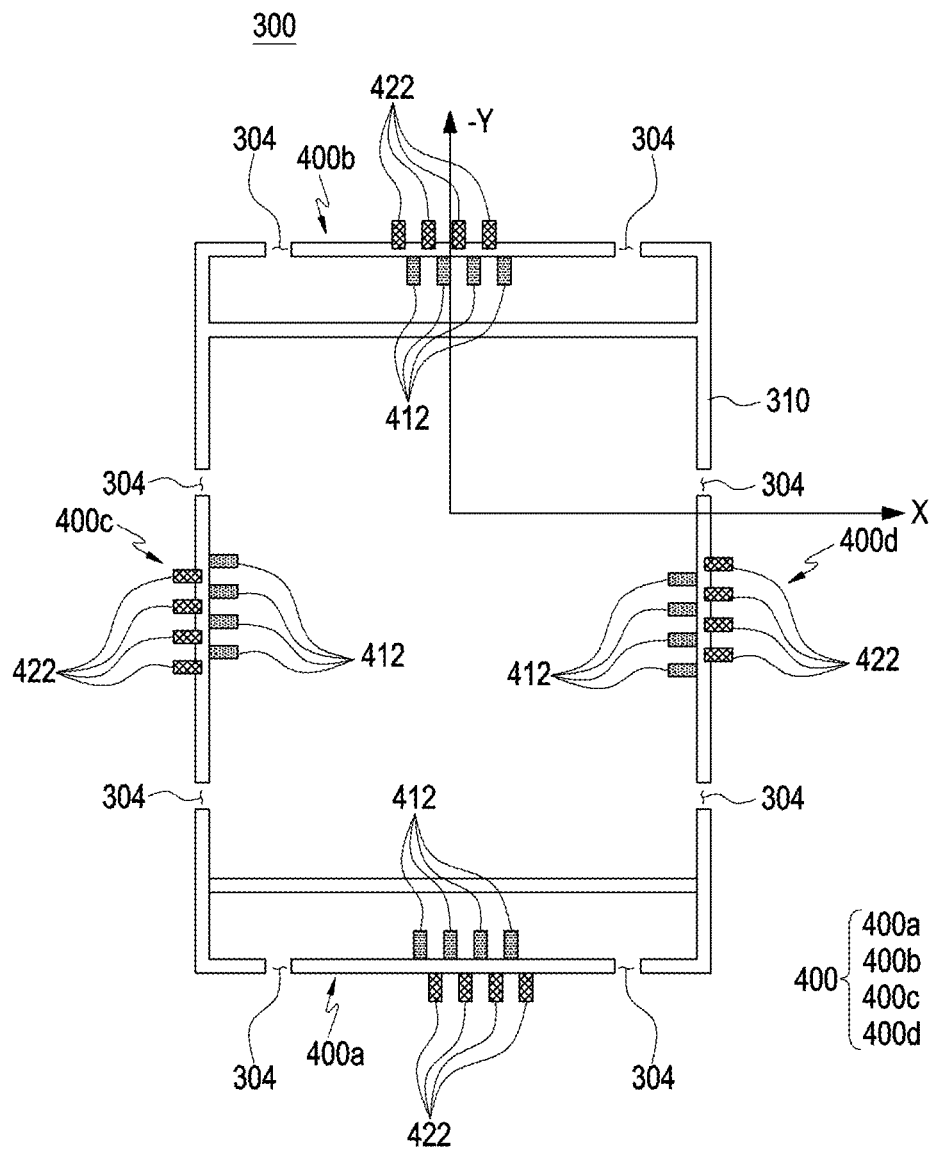
FIG. 13A is a view illustrating an electronic device including a plurality of antenna structures according to various embodiments of the present disclosure.
Figure 13B:
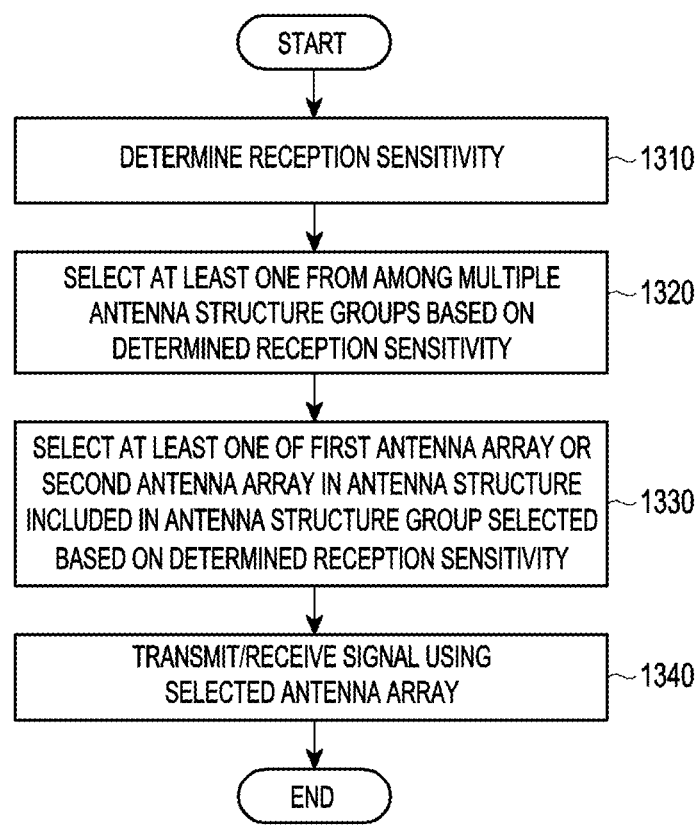
FIG. 13B is a block diagram illustrating a method for transmitting and receiving a radio signal by an electronic device having a plurality of antenna structures according to various embodiments of the present disclosure.

FIG. 13A is a view illustrating an electronic device 300 including a plurality of antenna structures 400 according to various embodiments of the present disclosure. FIG. 13B is a block diagram illustrating a method for transmitting and receiving a radio signal by an electronic device 300 having a plurality of antenna structures 400 according to various embodiments of the present disclosure. For example, FIG. 13A illustrates four antenna structures 400.

According to various embodiments of the present disclosure, the electronic device 300 may be provided with a plurality of the antenna structures 400. Rather than a single antenna structure 400 formed in a limited portion of the electronic device, a plurality of antenna structures 400 may be included in several portions of the electronic device. For example, not only is formed an antenna structure 400 in a lower portion of the electronic device 300 as in the embodiment shown in FIG. 13A, but an antenna structure 400 may also be formed in the opposite portion, i.e., upper portion, of the electronic device 300. Additionally or alternatively, an antenna structure 400 may also be formed on a left side and/or right side (see FIG. 3A) of the electronic device. At least one of the plurality of antenna structures 400 may be selected based on the reception sensitivity of radio signals and be used for transmission/reception of radio signals.

According to an embodiment, the antenna structures 400 may be formed in at least one pair. For example, the antenna structures 400 may include a first antenna structure 400a positioned in at least a portion of the electronic device and a second antenna structure 400b positioned on an opposite side of the first antenna structure 400a with respect to the center of the electronic device. The antenna structures 400 may include a third antenna structure 400c positioned in at least a portion of the electronic device and a fourth antenna structure 400d positioned on an opposite side of the third antenna structure with respect to the center of the electronic device, alternatively or in addition to the pair of the first antenna structure 400a and the second antenna structure 400b.

FIG. 13B is a flowchart of a method for transmitting/receiving a radio signal according to various embodiments of the present disclosure. In operation 1310, the electronic device 300 may determine reception sensitivity. In operation 1320, the electronic device 300 may select at least one from among a plurality of antenna structure groups based on the determined reception sensitivity. In operation 1330, the electronic device 300 may select at least one from among the plurality of slot sets 412 and 422 included in at least one antenna structure of the antenna structure group selected based on the determined reception sensitivity. In operation 1340, the electronic device 300 may transmit/receive a radio signal through the selected array antenna.

By forming the antenna structure 400 in this manner, it is possible to implement various antenna radiation modes, such as diversity, massive multi-input multi-output (massive MIMO), and full dimensional MIMO (FD-MIMO). For example, to implement MIMO, the plurality of antenna structures 400 inside the electronic device 300 may be configured to transmit/receive radio waves having different characteristics.

Figure 14A:
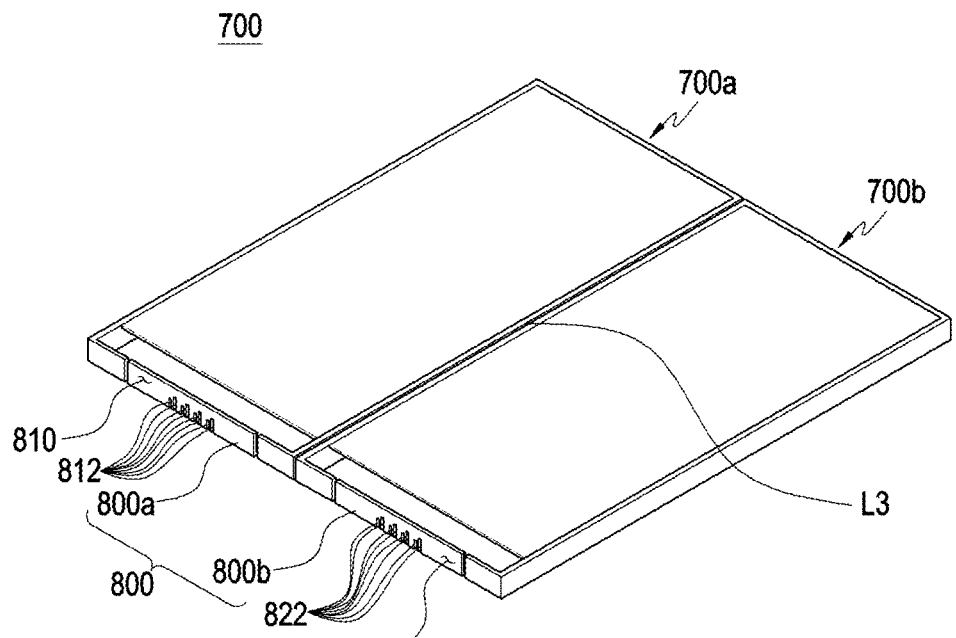
FIG. 14A is a perspective view illustrating a state in which an electronic device and an antenna structure are unfolded.
Figure 14B:
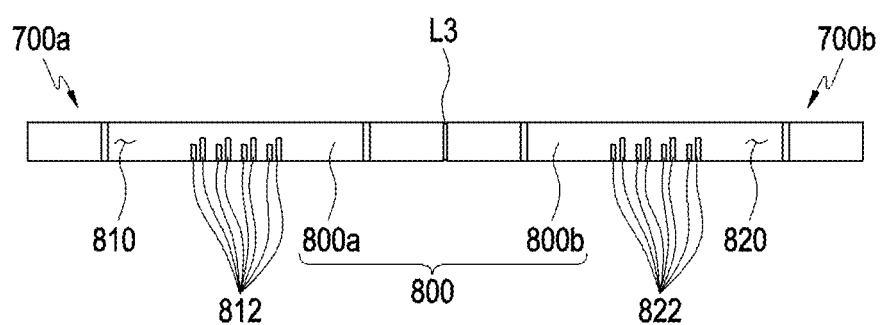
FIG. 14B is a side view illustrating a state in which an electronic device and an antenna structure are unfolded.
Figure 15A:
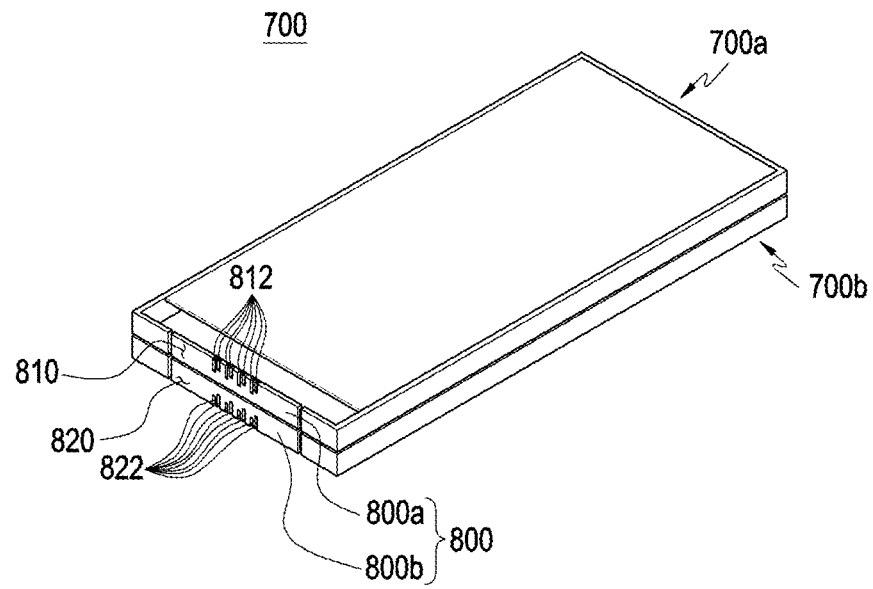
FIG. 15A is a perspective view illustrating a state in which an electronic device and an antenna structure are folded.
Figure 15B:
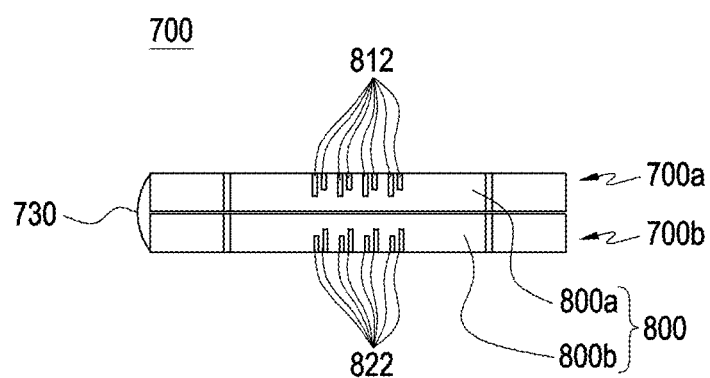
FIG. 15B is a side view illustrating a state in which an electronic device and an antenna structure are folded.

FIGS. 14A to 15B are views illustrating a foldable electronic device 700 and an antenna structure 800 according to various embodiments of the present disclosure. FIG. 14A is a perspective view illustrating a state in which an electronic device and an antenna structure are unfolded. FIG. 14B is a side view illustrating a state in which an electronic device and an antenna structure are unfolded. FIG. 15A is a perspective view illustrating a state in which an electronic device and an antenna structure are folded. FIG. 15B is a side view illustrating a state in which an electronic device and an antenna structure are folded.

According to various embodiments of the present disclosure, the electronic device 700 (e.g., the electronic device 101 of FIG. 1) may correspond to a foldable electronic device in which a flexible display panel is disposed. The foldable electronic device 700 may be configured such that a plurality of housing structures are rotatable with respect to each other. For example, the foldable electronic device 700 may include a first housing structure 700a and a second housing structure 700b formed to be rotatable (or foldable) on the first housing structure 700b. According to an embodiment, the first housing structure 700a and the second housing structure 700b may be formed to be foldable through a hinge structure 730.

In the embodiment shown in FIGS. 14A to 15B, the antenna structure 800 may include a first conductive portion 800a in which the first area 810 is formed and a second conductive portion 800b in which the second area 820 is formed.

According to various embodiments of the present disclosure, when the foldable electronic device 700 is folded, the first area 810 and the second area 820 may be disposed adjacent to each other, and the plurality of first slot sets 812 included in the first conductive portion 800a and the plurality of second slot sets 822 included in the second conductive portion 800b may be disposed in positions corresponding to each other.

According to an embodiment, when the electronic device 700 is foldable, the first area 810 and the second area 820 are formed separately in the two conductive portions 800a and 800b. However, in a state in which the foldable electronic device 700 is folded, it may be operated in a similar manner to where a first area 810 (e.g., the first area 410 of FIG. 4) and a second area 820 (e.g., the second area 420 of FIG. 4) may be formed in one conductive portion (e.g., the conductive portion 401 of FIG. 4), and a plurality of first slot sets 812 (e.g., the plurality of first slot sets 412 of FIG. 4) and a plurality of second slot sets 822 (e.g., the plurality of second slot sets 422 of FIG. 4) are formed therein.

Figures 16A, 16B, 16C, 16D, 16E:
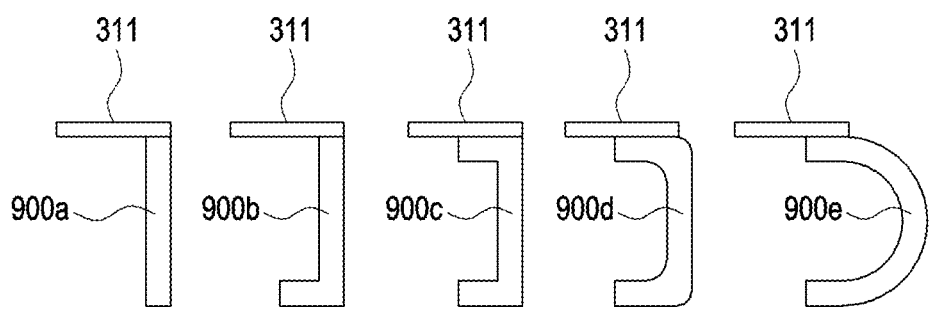
FIG. 16A is a view illustrating an antenna structure according to an embodiment of the present disclosure.
FIG. 16B is a view illustrating an antenna structure according to embodiment of the present disclosure.
FIG. 16C is a view illustrating an antenna structure according to embodiment of the present disclosure.
FIG. 16D is a view illustrating an antenna structure according to embodiment of the present disclosure.
FIG. 16E is a view illustrating an antenna structure according to embodiment of the present disclosure.

FIGS. 16A to 16E are views illustrating an antenna structure according to various embodiments of the present disclosure. FIG. 16A is a view illustrating an antenna structure according to an embodiment. FIG. 16B is a view illustrating an antenna structure according to another embodiment. FIG. 16C is a view illustrating an antenna structure according to another embodiment. FIG. 16D is a view illustrating an antenna structure according to another embodiment. FIG. 16E is a view illustrating an antenna structure according to another embodiment.

Referring to FIGS. 16A to 16E, the electronic device 300 may further include a cover member or a display member 311 to cover at least a portion of the antenna structure.

According to various embodiments of the disclosure, the shape of the antenna structure (e.g., the antenna structure 400 of FIG. 5) is not defined in any specific form, and various embodiments may be applied thereto. For example, as shown in FIG. 16A, the antenna structure 900a may have a flat plate shape. As another example, as shown in FIG. 16B, the antenna structure 900b may have a shape (e.g., an "L" shape) including a flat plate and an extension extending from one side of the plate. As another example, as shown in FIG. 16C, the antenna structure 900c may have a shape (e.g., an "I" shape or a "C" shape) including a flat plate and extensions extending from two opposite sides of the plate. As another example, as shown in FIG. 16D, the antenna structure 900*d* may include a flat plate and extensions extending from one side and the opposite side, respectively, of the plate. At least a portion (e.g., the extension) of the antenna structure 900*d* may be not covered by the display member 311 but may protrude. As another example, as shown in FIG. 16E, the antenna structure 900*d* may have a shape bent outward. As such, various embodiments described above in relation to the first slot sets and the second slot sets may be applied to various shapes of antenna structures.

Figure 17A:
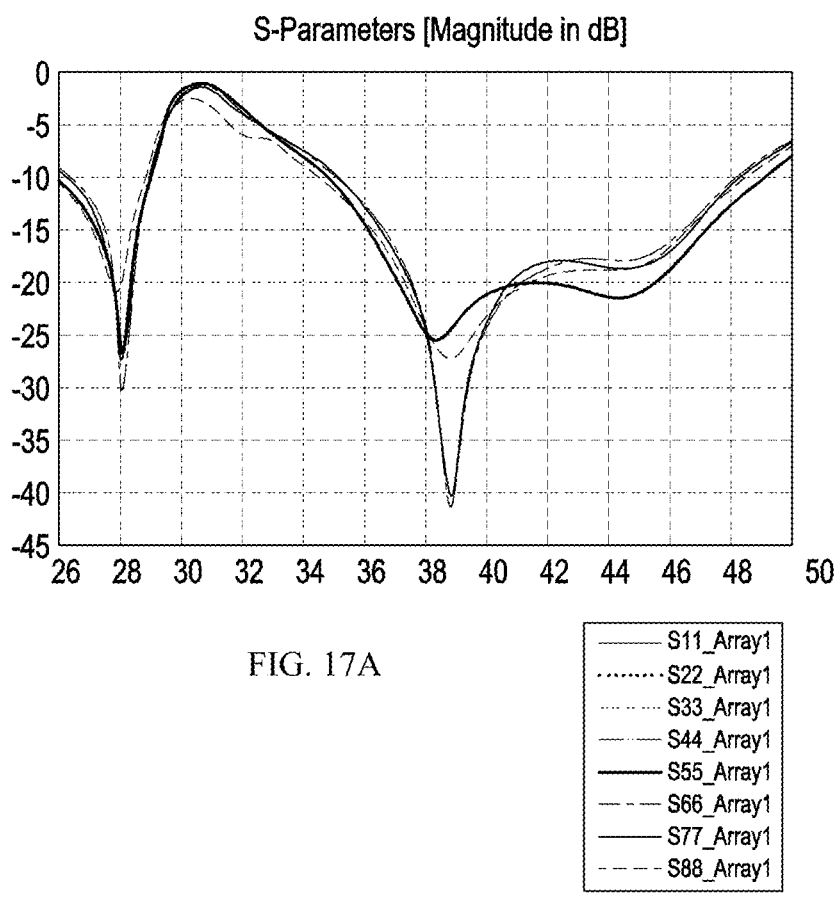
FIG. 17A is a view illustrating a reflection coefficient of an antenna structure in which a plurality of slots are formed according to an embodiment of the present disclosure.
Figure 17B:
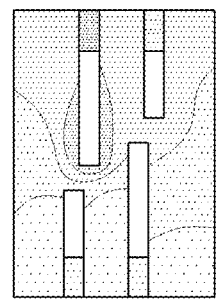
FIG. 17B is a view illustrating a state in which a surface current flows in an antenna structure in which a plurality of slots are formed according to an embodiment of the present disclosure.
Figure 17C:
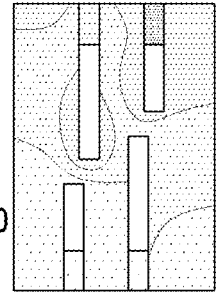
FIG. 17C is a view illustrating a state in which a surface current flows in an antenna structure in which a plurality of slots are formed according to an embodiment of the present disclosure.

FIG. 17A is a view illustrating the reflection coefficient of an antenna structure (e.g., the antenna structure 400 of FIG. 7) formed with a plurality of slots according to various embodiments of the present disclosure. FIG. 17B is a view illustrating a state in which a surface current flows in an antenna structure in which a plurality of slots are formed, according to an embodiment. FIG. 17C is a view illustrating a state in which a surface current flows in an antenna structure in which a plurality of slots are formed, according to an embodiment.

Referring to FIG. 17A, according to various embodiments of the disclosure, S11, S22, S33, and S44 may identify the resonant frequency of each antenna element (e.g., the first slot set 411) of a plurality of first slot sets (e.g., the plurality of first slot sets 412 of FIG. 4) (or a first array antenna) included in the antenna structure 400 according to various embodiments of the present disclosure, and S55, S66, S77, and S88 may identify the resonant frequency for each antenna element (e.g., the second slot set 421) of a plurality of second slot sets (e.g., the plurality of second slot sets 422 of FIG. 4) (or a second array antenna) included in the antenna structure 400 according to various embodiments of the disclosure. It may be identified that the first array antenna and the second array antenna may form a resonant frequency even at about 28 GHz and about 39 GHz.

Referring to FIGS. 17B and 17C together, it may be identified that the flow of the surface current when the resonant frequency corresponds to 28 GHz is clearly different from the flow of the surface current when the resonant frequency corresponds to 39 GHz. As may be identified from the drawings, the plurality of first slot sets and the plurality of second slot sets may cover various resonant frequency ranges. According to an embodiment, each of the plurality of first slot sets and the plurality of second slot sets included in the antenna structure may include a slot set in which a plurality of slots are formed and may cover a plurality of different resonant frequency ranges through the plurality of slots. According to an embodiment, any one of the plurality of slots included in each of the first slot set and the second slot set is formed to have a different length from an adjacent slot, so that it may be used as a multi-band antenna covering various frequency bands, and tuning and optimization may be easy. Further, according to an embodiment, the antenna structure may support a variety of frequency bands required in complex multi-band communication.

Figures 18A, 18B, 18C:
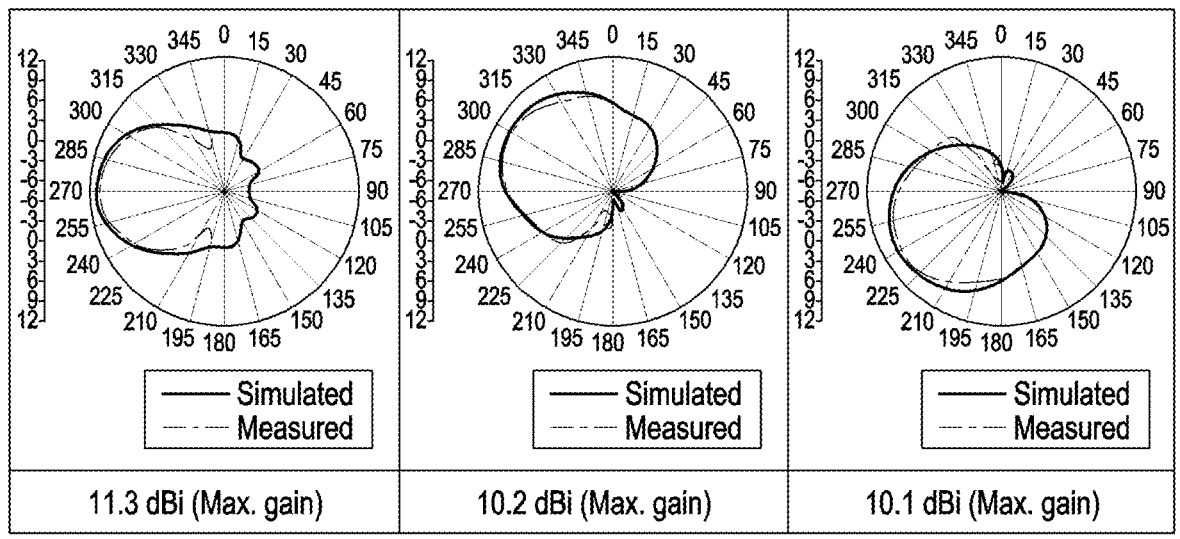
FIG. 18A is a view illustrating a radiation range of an antenna structure in a first frequency band according to an embodiment of the present disclosure.
FIG. 18B is a view illustrating a radiation range of an antenna structure in a first frequency band according to embodiment of the present disclosure.
FIG. 18C is a view illustrating a radiation range of an antenna structure in a first frequency band according to embodiment of the present disclosure.
Figures 19A, 19B, 19C:
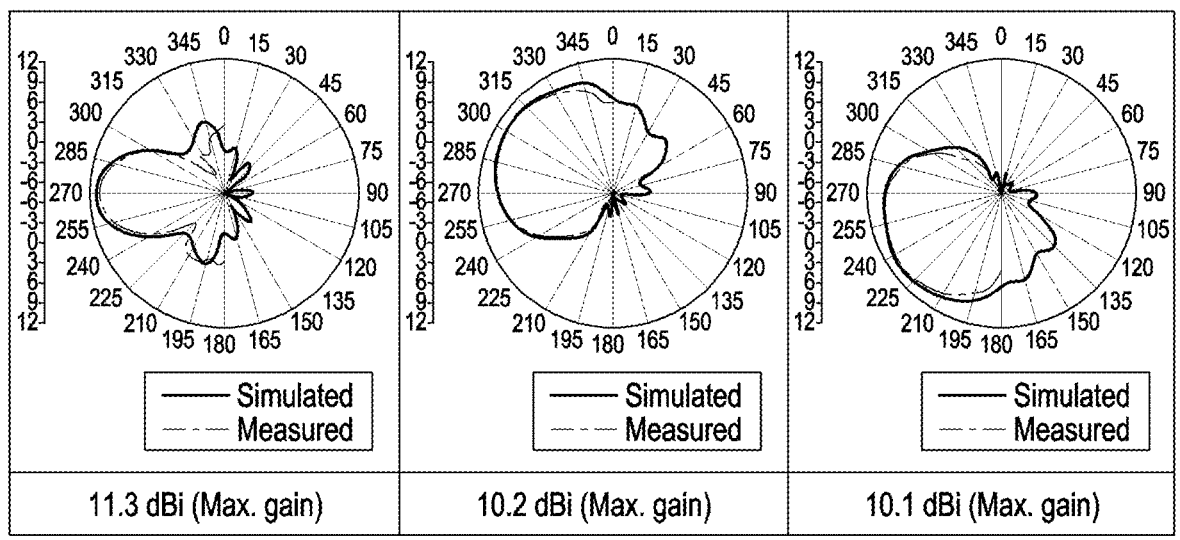
FIG. 19A is a view illustrating a radiation range of an antenna structure in a second frequency band according to an embodiment of the present disclosure.
FIG. 19B is a view illustrating a radiation range of an antenna structure in a second frequency band according to embodiment of the present disclosure.
FIG. 19C is a view illustrating a radiation range of an antenna structure in a second frequency band according to embodiment of the present disclosure.

FIG. 18A is a view illustrating a radiation range of an antenna structure in a first frequency band according to an embodiment of the present disclosure. FIG. 18B is a view illustrating a radiation range of an antenna structure in a first frequency band, according to another embodiment. FIG. 18C is a view illustrating a radiation range of an antenna structure in a first frequency band, according to another embodiment. FIG. 19A is a view illustrating a radiation range of an antenna structure in a second frequency band, according to an embodiment. FIG. 19B is a view illustrating a radiation range of an antenna structure in a second frequency band, according to another embodiment. FIG. 19C is a view illustrating a radiation range of an antenna structure in a second frequency band, according to another embodiment.

FIGS. 18A to 19C may illustrate gain characteristics according to various antenna beam radiation modes when an electronic device (e.g., the electronic device 300 of FIG. 3A) includes an antenna structure (e.g., the antenna structure 400 of FIG. 7). Through the gain characteristics, it is possible to identify the radiation pattern according to various antenna beam radiation modes of the antenna structure 400.

FIGS. 18A and 19A may illustrate the radiation pattern according to the first array mode in which the plurality of first slot sets (e.g., the plurality of first slot sets 412 of FIG. 4) and the plurality of second slot sets (e.g., the plurality of second slot sets 422 of FIG. 4) are together fed. FIGS. 18B and 19B may illustrate the radiation pattern according to the second array mode in which the plurality of first slot sets 412 are fed. FIGS. 18C and 19C may illustrate the radiation pattern according to the third array mode in which the plurality of second slot sets 422 are fed.

A look at FIGS. 18A to 19C together reveals that it is possible to actually measure gain characteristics in a substantially similar form to simulated gain characteristics by using the antenna structure 400 according to various embodiments of the disclosure. According to various embodiments of the disclosure, it is possible to widen the supportable frequency bandwidth and present high matching rate by using the antenna structure 400 according to various embodiments of the disclosure.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "functionally," "operatively" or "communicatively", as "coupled with," "coupled to," "connected with," or "connected to" another element (e.g., a second element), it means that the element may be coupled with the other element directly (e.g., wiredly), wirelessly, or via a third element. Further, as used herein, the term "connection" may mean that a certain (e.g., first) component is connected to another (e.g., second) component, not only "directly" or "indirectly" but also "physically", or "chemically", or "electrically".

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, an electronic device (e.g., the electronic device 300 of FIG. 3A) may comprise a housing (e.g., the housing 310 of FIG. 3A) including a first plate; a second plate facing in a direction opposite to the first plate; and a side surface member (e.g., the side surface member 303 of FIG. 3A) surrounding a space between the first plate and the second plate and at least partially including a conductive portion (e.g., the conductive portion 401 of FIG. 4); a communication module (e.g., the communication module 190 of FIG. 1); and an antenna structure (e.g., the antenna structure 400 of FIG. 3A) electrically connected with the communication module. The conductive portion of the side surface member may include a first area (e.g., the first area 410 of FIG. 5) and a second area (e.g., the second area 420 of FIG. 5) formed in a position different from the first area.

The antenna structure may include a plurality of first slot sets (e.g., the plurality of first slot sets 412 of FIG. 4) formed in the first area, a first slot set (e.g., the first slot set 411 of FIG. 4) formed by combining at least two first slots extending in a first direction, and the plurality of first slot sets formed with a first designated gap (e.g., the first designated gap g2 or g3 of FIG. 5) in a second direction; and a plurality of second slot sets (e.g., the plurality of second slot sets 422 of FIG. 4) formed in the second area, a second slot set (e.g., the second slot set 421 of FIG. 4) formed by combining at least two second slots extending in the first direction, and the plurality of second slot sets formed with a second designated gap (e.g., the second designated gap g5 or g6 of FIG. 5) in the second direction. At least two first slots included in the first slot set may be formed to have different lengths in the first direction each other, and at least two second slots included in the second slot set may be formed to have different lengths in the first direction each other.

According to various embodiments of the present disclosure, the second designated gap may be set to be identical to the first designated gap. Each second slot set included in the plurality of second slot sets may be formed in a position corresponding to a position in which each first slot set included in the plurality of first slot sets is formed.

According to various embodiments of the present disclosure, the second slot set formed in the position corresponding to the first slot set may be parallel to the second direction and may have a shape symmetrical with the first slot set with respect to a designated point in a virtual line passing through a center of the conductive portion.

According to various embodiments of the present disclosure, the conductive portion may surround at least a portion of the electronic device and include a first surface (e.g., the first surface 401a of FIG. 5) facing an outside of the electronic device. When viewed from above the first surface, the first area and the second area may be divided by the virtual line (e.g., the virtual line L1 of FIG. 5 or the virtual line L2 of FIG. 7).

According to various embodiments of the present disclosure, the electronic device may be a foldable electronic device (e.g., the foldable electronic device 700 of FIG. 14) including a first housing structure (e.g., the first housing structure 700a of FIG. 14) and a second housing structure (e.g., the second housing structure 700b of FIG. 14). The conductive portion (e.g., the antenna structure 800 of FIG. 14) may include a first conductive portion (e.g., the first conductive portion 800a of FIG. 14) included in the first housing structure and formed with the first area; and a second conductive portion (e.g., the second conductive portion 800b of FIG. 14) included in the second housing structure and formed with the second area. When the foldable electronic device is folded, the first area and the second area may be disposed adjacent to each other, and the plurality of first slot sets included in the first conductive portion and the plurality of second slot sets included in the second conductive portion may be formed to be disposed in positions corresponding to each other.

According to various embodiments of the present disclosure, the electronic device may further comprise an extension (e.g., the first extension 402 of FIG. 5 and/or the second extension 403 of FIG. 5) extending from the conductive portion and formed with at least one surface at least partially facing in a direction different from a direction in which the first surface faces.

According to various embodiments of the present disclosure, the extension may include a first extension (e.g., the first extension 402 of FIG. 5) extending from a first end of the conductive portion and formed with a second surface at least partially facing in a direction different from the direction in which the first surface faces; and a second extension (e.g., the second extension 403 of FIG. 5) extending from a second end of the conductive portion and formed with a third surface at least partially facing in a direction different from the direction in which the first surface faces.

According to various embodiments of the present disclosure, the first area may be formed on at least a portion of the conductive portion and the first extension, and the second area is formed on at least a portion of the conductive portion and the second extension, and the first slot and the second slot may extend on the first extension and the second extension, respectively, in a third direction.

According to various embodiments of the present disclosure, at least a portion of the plurality of first slots may further extend on the first extension in a fourth direction, and at least a portion of the plurality of second slots may further extend on the second extension in a direction opposite to the fourth direction.

According to various embodiments of the present disclosure, the electronic device may further comprise a cover member or a display member (e.g., the display member 311 of FIG. 3A) covering at least a portion of the extension.

According to various embodiments of the present disclosure, the plurality of first slot sets may form a first array antenna, and the plurality of second slot sets may form a second array antenna.

According to various embodiments of the present disclosure, at least one first feeding line (e.g., the first feeding line 360 of FIG. 10) may be disposed in a position couplable with the first slot set, and at least one second feeding line may be disposed in a position couplable with the second slot set.

According to various embodiments of the present disclosure, the first feeding line and the second feeding line may be able to independently feed the first slot sets and the second slot sets, respectively.

According to various embodiments of the present disclosure, the conductive portion may include a first surface surrounding an inner space of the electronic device and facing an outside of the electronic device. The antenna structure may further include a first extension extending from a first end of the conductive portion and formed with a second surface at least partially facing in a direction different from a direction in which the first surface faces or a second extension extending from a second end of the conductive portion and formed with a third surface at least partially facing in a direction from the direction in which the first surface faces. The first conductive line or the second conductive line, respectively, may be electrically connected to the first extension or the second extension.

According to various embodiments of the present disclosure, the electronic device may further comprise at least one processor (e.g., the processor 120 of FIG. 1). The processor may be configured to control beamforming in a horizontal direction using the antenna structure or control beamforming in a vertical direction using the antenna structure.

According to various embodiments of the disclosure, an electronic device (e.g., the electronic device 300 of FIG. 3A) may comprise a housing (e.g., the housing 310 of FIG. 3A) including a first plate; a second plate facing in a direction opposite to the first plate; and a side surface member (e.g., the side surface member 303 of FIG. 3A) surrounding a space between the first plate and the second plate and at least partially including a conductive portion (e.g., the conductive portion 401 of FIG. 4); a communication module (e.g., the communication module 190 of FIG. 1); an antenna structure (e.g., the antenna structure 400 of FIG. 3A) electrically connected with the communication module; and at least one processor (e.g., the processor 190 of FIG. 1) controlling beamforming in a horizontal direction using the antenna structure or controlling beamforming in a vertical direction using the antenna structure. The conductive portion of the side surface member may include a first area (e.g., the first area 410 of FIG. 5) and a second area (e.g., the second area 420 of FIG. 5) formed in a position different from the first area.

The antenna structure may include first slot sets formed in the first area, a first slot set formed by combining at least two first slots (e.g., the first slot 411 of FIG. 5) extending in a first direction, the plurality of first slot sets formed with a designated gap in a second direction; and second slot sets formed in the second area, a second slot set formed by combining at least two second slots (e.g., the second slot 412 of FIG. 5), the plurality of second slot sets formed with the designated gap in the second direction. At least two first slots included in the first slot set may be formed to have different lengths in the first direction each other, and at least two second slots included in the second slot set may be formed to have different lengths in the second direction each other. The first slot set and the second slot set formed in a position corresponding to the first slot set are symmetrically formed with respect to a designated point (e.g., the designated point C1 of FIG. 6) in a virtual line (e.g., the virtual line L1 of FIG. 5) passing through a center of the conductive portion.

According to various embodiments of the present disclosure, the conductive portion may surround the inner space of the electronic device and include a first surface (e.g., the first surface 401a of FIG. 5) facing an outside of the electronic device. When viewed from above the first surface, the first area may include a partial area of the conductive portion, and the second area may include another partial area of the conductive portion divided from the first area with respect to the virtual line passing through the center of the conductive portion.

According to various embodiments of the present disclosure, the electronic device may be a foldable electronic device (e.g., the foldable electronic device 700 of FIG. 14). The conductive portion may include a first conductive portion (e.g., the first conductive portion 800a of FIG. 14) formed with the first area; and a second conductive portion (e.g., the second conductive portion 800b of FIG. 14) formed with the second area and rotatable with the first conductive portion. When the foldable electronic device is folded, the first area and the second area may be disposed adjacent to each other, and the plurality of first slot sets included in the first conductive portion and the plurality of second slot sets included in the second conductive portion may be formed to be disposed in positions corresponding to each other.

According to various embodiments of the disclosure, an electronic device (e.g., the electronic device 300 of FIG. 3A) may comprise a housing (e.g., the housing 310 of FIG. 3A) including a first plate; a second plate facing in a direction opposite to the first plate; and a side surface member (e.g., the side surface member 303 of FIG. 3A) surrounding a space between the first plate and the second plate and at least partially including a conductive portion (e.g., the conductive portion 401 of FIG. 4); and at least one antenna structure (e.g., the antenna structure 400 of FIG. 3A) disposed in at least a portion of the side surface member.

The antenna structure may include a conductive portion surrounding the space and including a first surface (e.g., the first surface 401a of FIG. 5) facing an outside of the electronic device and at least one of a first extension (e.g., the first extension 402 of FIG. 5) extending from a first end of the conductive portion and formed with a second surface at least partially facing in a direction different from a direction in which the first surface faces or a second extension (e.g., the second extension 403 of FIG. 5) extending from a second end of the conductive portion and formed with a third surface at least partially facing in a direction different from the direction in which the first surface faces. The conductive portion may include a first area (e.g., the first area 410 of FIG. 5) in which a first slot set (e.g., the first slot set 411 of FIG. 5) is formed and a second area (e.g., the second area 420 of FIG. 5) in which a second slot set is formed. The first slot set is formed of a combination of at least two first slots formed to have different lengths in a first direction (e.g., a direction parallel to the Z axis of FIG. 5) each other.

A plurality of first slot sets may be formed with a designated gap (e.g., the designated gap g2 or g3 of FIG. 5) in a second direction (e.g., a direction parallel to the X axis of FIG. 5). The second slot set may be formed of a combination of at least two second slots formed to have different lengths in the first direction each other. A plurality of second slot sets may be formed with a designated gap (e.g., the designated gap g5 or g6 of FIG. 5) in the second direction. The second slot set formed in a position corresponding to the first slot set may have a shape symmetrical with the first slot set with respect to a designated point (e.g., the designated point C1 of FIG. 6) in a virtual line (e.g., the virtual line L1 of FIG. 5) passing through the conductive portion.

According to various embodiments of the present disclosure, the antenna structure may be electrically insulated from other portions of the side surface member through a segment (e.g., the segment 304 of FIG. 4).

While the present disclosure has been shown and described with reference to exemplary embodiments thereof, it will be apparent to those of ordinary skill in the art that various changes in form and detail may be made thereto without departing from the spirit and scope of the present disclosure as defined by the following claims. For example, in specific embodiments of the disclosure, there are exemplified and mentioned resonant frequencies or frequency bands forming a resonant frequency depending on the arrangement structure and operations of a plurality of first slot sets or a plurality of second slot sets or first slots and second slots included therein, but may be set as appropriate depending on, e.g., the antenna structure to be actually manufactured or the structure, requirements, and actual use environment of the electronic device equipped with the antenna structure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a housing including a first plate;
a second plate facing in a direction opposite to the first plate;
a side surface member surrounding a space between the first plate and the second plate and including a conductive portion;
a communication module; and
an antenna structure operably connected to the communication module,
wherein:
the conductive portion of the side surface member includes a first area and a second area formed in a position different from the first area;
the antenna structure includes:
a plurality of first slot sets formed in the first area, a first slot set formed by combining at least two first slots extending in a first direction, and the plurality of first slot sets formed with a first designated gap in a second direction, and
a plurality of second slot sets formed in the second area, a second slot set formed by combining at least two second slots extending in the first direction, and the plurality of second slot sets formed with a second designated gap in the second direction; and
at least two first slots included in the first slot set are formed to include different lengths in the first direction, respectively, and at least two second slots included in the second slot set are formed to include different lengths in the first direction, respectively.

2. The electronic device of claim 1, wherein the second designated gap is set to be identical to the first designated gap, and
wherein each second slot set included in the plurality of second slot sets is formed in a position corresponding to a position in which each first slot set included in the plurality of first slot sets is formed.

3. The electronic device of claim 2, wherein the second slot set formed in the position corresponding to the first slot set is configured in parallel to the second direction and includes a shape symmetrical with the first slot set with respect to a designated point in a virtual line passing through a center of the conductive portion.

4. The electronic device of claim 2, wherein the conductive portion surrounds at least a portion of an inner space of the electronic device and includes a first surface facing an outside of the electronic device, and
wherein when viewed from above the first surface, the first area and the second area are divided by a virtual line.

5. The electronic device of claim 1, wherein the electronic device is a foldable electronic device including a first housing structure and a second housing structure,
wherein:
the conductive portion includes:
a first conductive portion included in the first housing structure and formed with the first area, and a second conductive portion included in the second housing structure and formed with the second area; and when the foldable electronic device is folded, the first area and the second area are disposed adjacent to each other, and the plurality of first slot sets included in the first conductive portion and the plurality of second slot sets included in the second conductive portion are formed to be disposed in positions corresponding to each other.

6. The electronic device of claim 1, further comprising an extension extending from the conductive portion, the extension formed with at least one surface facing in a direction different from a direction in which a first surface faces.

7. The electronic device of claim 6, wherein the extension includes,
a first extension extending from a first end of the conductive portion, the first extension formed with a second surface facing in a direction different from the direction in which the first surface faces; and
a second extension extending from a second end of the conductive portion, the second extension formed with a third surface facing in a direction different from the direction in which the first surface faces.

8. The electronic device of claim 7, wherein the first area is formed on at least a portion of the conductive portion and the first extension, and the second area is formed on at least a portion of the conductive portion and the second extension, and
wherein the first slot and the second slot extend on the first extension and the second extension, respectively, in a third direction.

9. The electronic device of claim 7, wherein at least portion of the plurality of first slot sets further extend on the first extension in a fourth direction, and at least portion of the plurality of second slot sets further extend on the second extension in a direction opposite to the fourth direction.

10. The electronic device of claim 6, further comprising a cover member or a display member covering at least portion of the extension.

11. The electronic device of claim 1, wherein the plurality of first slot sets forms a first array antenna and the plurality of second slot sets forms a second array antenna.

12. The electronic device of claim 1, wherein at least one first feeding line is disposed in a position couplable with the first slot set and at least one second feeding line is disposed in a position couplable with the second slot set.

13. The electronic device of claim 12, wherein the first feeding line and the second feeding line are configured to independently feed the first slot sets and the second slot sets, respectively.

14. The electronic device of claim 12, wherein:
the conductive portion surrounds an inner space of the electronic device and includes a first surface facing an outside of the electronic device;
the antenna structure further includes a first extension extending from a first end of the conductive portion, the antenna structure formed with a second surface facing in a direction different from a direction in which the first surface faces or a second extension extending from a second end of the conductive portion and formed with a third surface facing in a direction from the direction in which the first surface faces; and
a first conductive line or a second conductive line is electrically connected to the first extension or the second extension, respectively.

15. The electronic device of claim 1, further comprising at least one processor
configured to control beamforming in a horizontal direction or a vertical direction using the antenna structure.

16. An electronic device comprising:
a housing including:
a first plate;
a second plate facing in a direction opposite to the first plate;
a side surface member surrounding a space between the first plate and the second plate and including a conductive portion;
a communication module;
an antenna structure operably connected to the communication module; and
at least one processor controlling beamforming in a horizontal direction using the antenna structure or controlling beamforming in a vertical direction using the antenna structure,
wherein the conductive portion of the side surface member includes a first area and a second area formed in a position different from the first area,
wherein the antenna structure includes:
first slot sets formed in the first area, a first slot set formed by combining at least two first slots extending in a first direction, a plurality of first slot sets formed with a designated gap in a second direction; and second slot sets formed in the second area, a second slot set formed by combining at least two second slots, a plurality of second slot sets formed with the designated gap in the second direction,
wherein at least two first slots included in the first slot set are formed to include different lengths in the first direction each other, and at least two second slots included in the second slot set are formed to include different lengths in the second direction each other, and
wherein the first slot set and the second slot set formed in a position corresponding to the first slot set are symmetrically formed with respect to a designated point in a virtual line passing through a center of the conductive portion.

17. The electronic device of claim 16, wherein the conductive portion surrounds an inner space of the electronic device and includes a first surface facing an outside of the electronic device, and wherein when viewed from above the first surface, the first area includes a partial area of the conductive portion and the second area includes another partial area of the conductive portion divided from the first area with respect to the virtual line passing through the center of the conductive portion.

18. The electronic device of claim 16, wherein the electronic device is a foldable electronic device,
wherein the conductive portion includes a first conductive portion formed with the first area and a second conductive portion formed with the second area and rotatable with the first conductive portion,
wherein, when the foldable electronic device is folded, the first area and the second area are disposed adjacent to each other, and the plurality of first slot sets included in the first conductive portion and the plurality of second slot sets included in the second conductive portion are formed to be disposed in positions corresponding to each other.

19. An electronic device comprising:
a housing including:
a first plate, a second plate facing in a direction opposite to the first plate, and a side surface member surrounding a space between the first plate and the second plate and at least partially including a conductive portion; and at least one antenna structure disposed in at least a portion of the side surface member, wherein the at least one antenna structure includes:

a conductive portion surrounding the space and including a first surface facing an outside of the electronic device, at least one of a first extension extending from a first end of the conductive portion and formed with a second surface at least partially facing in a direction different from a direction in which the first surface faces or a second extension extending from a second end of the conductive portion and formed with a third surface at least partially facing in a direction different from the direction in which the first surface faces, and the conductive portion includes a first area in which a first slot set is formed and a second area in which a second slot set is formed, wherein the first slot set is formed with a combination of at least two first slots formed to include different lengths in a first direction respectively, wherein a plurality of first slot sets is formed with a designated gap in a second direction, wherein the second slot set is formed with a combination of at least two second slots formed to include different lengths in the first direction respectively, wherein a plurality of second slot sets is formed with a designated gap in the second direction, and wherein the second slot set formed in a position corresponding to the first slot set includes a shape symmetrical with the first slot set with respect to a designated point in a virtual line passing through the conductive portion.

20. The electronic device of claim 19, wherein the antenna structure is electrically insulated from other portions of the side surface member through a segment.

* * * * *